(12) United States Patent
Wang et al.

(10) Patent No.: US 9,304,379 B1
(45) Date of Patent: Apr. 5, 2016

(54) PROJECTION DISPLAY INTENSITY EQUALIZATION

(71) Applicant: Rawles LLC, Wilmington, DE (US)

(72) Inventors: Eric Wang, Cupertino, CA (US); Sankara Narayana Hemanth Meenakshisundaram, San Jose, CA (US); Sanjukta Mitra, Santa Clara, CA (US); Choudhary Omer Rafique, Campbell, CA (US)

(73) Assignee: Amazon Technologies, Inc., Seattle, WA (US)

( * ) Notice: Subject to any disclaimer, the term of this patent is extended or adjusted under 35 U.S.C. 154(b) by 13 days.

(21) Appl. No.: 13/767,596

(22) Filed: Feb. 14, 2013

(51) Int. Cl.
G09G 3/00 (2006.01)
G03B 21/14 (2006.01)
G09G 3/22 (2006.01)

(52) U.S. Cl.
CPC ............ G03B 21/142 (2013.01); G03B 21/14 (2013.01); G09G 3/22 (2013.01)

(58) Field of Classification Search
CPC . H04N 9/3185; H04N 9/3194; H04N 9/3197; H04N 9/3182; H04N 9/3188; H04N 2201/0452; H04N 5/23296; H04N 5/7416; G03B 21/14; G03B 21/00; G03B 21/26; G03B 21/53; G03B 21/56; G06F 1/1639; G06F 3/0425; G06F 2320/0242; G06F 2320/0666; G06F 2320/0693; G09G 2340/0407; G09G 2340/14; G09G 3/001; G09G 3/002
See application file for complete search history.

(56) References Cited

U.S. PATENT DOCUMENTS

| | | | |
|---|---|---|---|
| 8,212,741 B2 * | 7/2012 | Raman et al. .................. 345/1.1 |
| 8,337,025 B2 * | 12/2012 | Kobayashi et al. ............. 353/79 |
| 2003/0025649 A1 * | 2/2003 | Wynne Willson ................ 345/6 |
| 2003/0067422 A1 * | 4/2003 | Suyama et al. ................... 345/6 |
| 2003/0067432 A1 * | 4/2003 | Watanabe et al. ............... 345/87 |
| 2005/0253776 A1 * | 11/2005 | Lee et al. ........................ 345/1.3 |
| 2007/0165027 A1 * | 7/2007 | Nakadaira et al. ............ 345/426 |
| 2010/0079468 A1 * | 4/2010 | Pance et al. ................... 345/501 |
| 2010/0214254 A1 * | 8/2010 | Tsai .............................. 345/174 |
| 2012/0176419 A1 * | 7/2012 | Otoi et al. ..................... 345/690 |
| 2012/0182416 A1 * | 7/2012 | Kawaguchi ................... 348/128 |
| 2012/0182531 A1 * | 7/2012 | Ueno et al. ...................... 353/85 |
| 2012/0194537 A1 * | 8/2012 | Huang et al. .................. 345/589 |
| 2012/0223885 A1 | 9/2012 | Perez |

FOREIGN PATENT DOCUMENTS

WO   WO2011088053 A2   7/2011

OTHER PUBLICATIONS

Pinhanez, "The Everywhere Displays Projector: A Device to Create Ubiquitous Graphical Interfaces", IBM Thomas Watson Research Center, Ubicomp 2001, Sep. 30-Oct. 2, 2001, 18 pages.

* cited by examiner

Primary Examiner — Stephen Sherman
(74) Attorney, Agent, or Firm — Lee & Hayes, PLLC

(57) ABSTRACT

In some examples, the intensity of an image projected onto a surface at an oblique angle may be controlled to equalize the intensity, and thereby to eliminate from the image perceptible variations in brightness. For instance, a first distance to a closer portion of the image and a second distance to a farther portion of the image may be used to determine an amount of change to be made to the intensity of at least one portion of the image. In some implementations, a filter may be used to control changes to the intensity of the image. In other implementations, the image information may be modified, such as on a pixel level, to control the intensity of the image.

26 Claims, 11 Drawing Sheets

PROJECTION DISPLAY INTENSITY EQUALIZATION

BACKGROUND

A projector system may project an image onto a projection display screen, a projection display medium, or other display surface. Projection of the image onto the display surface from a projection direction that is perpendicular to the display surface typically results in the image being displayed as intended. However, in some environments, the image may be projected onto the display surface from an oblique angle. This can cause a noticeable variation in the intensity or perceived brightness of one side of the image as compared with that of the other side of the image.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
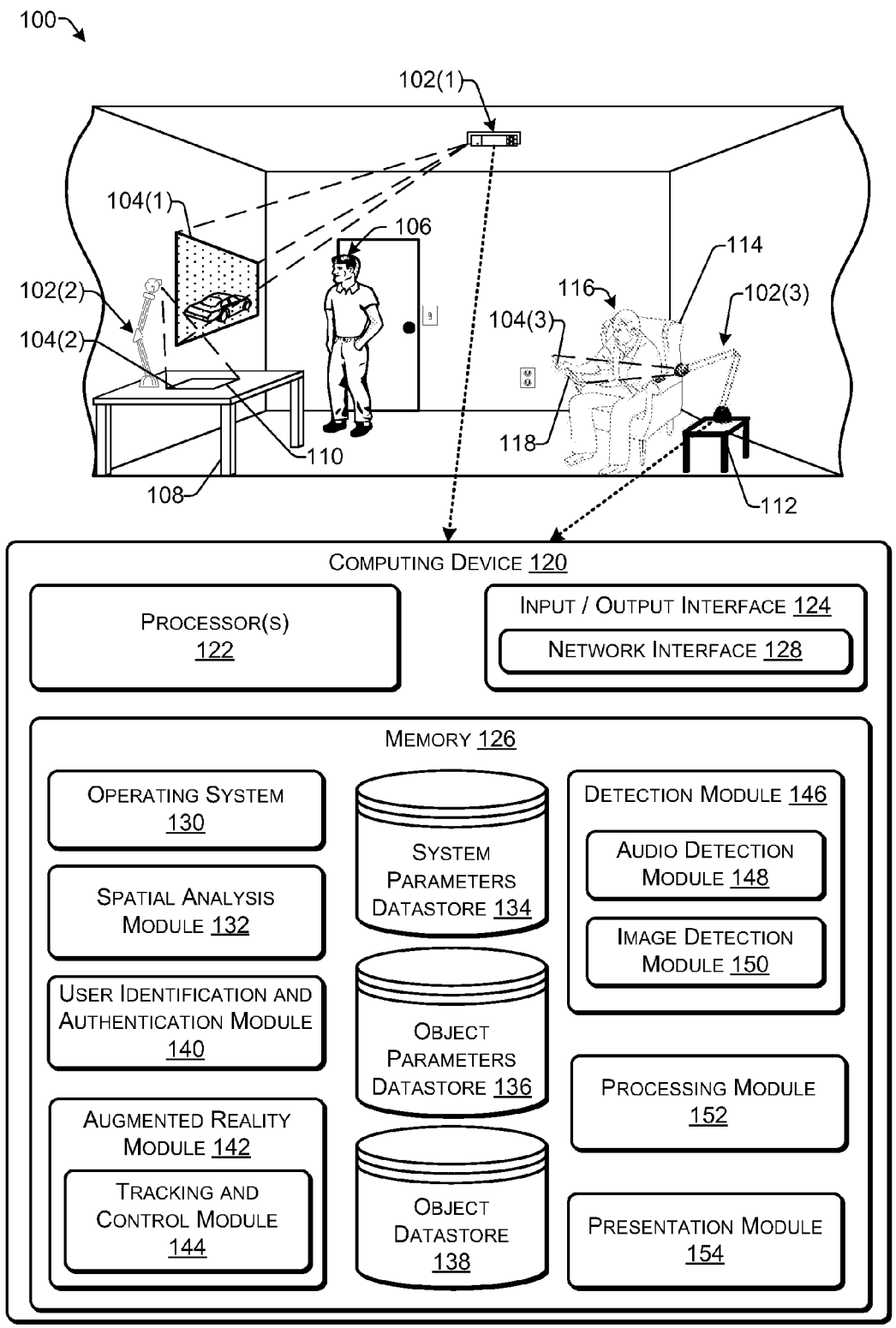
FIG. 1 illustrates an example environmental area, such as a room, in which some implementations of the projection techniques and arrangements described herein may be employed.

This disclosure describes techniques and arrangements for displaying projected images on a display surface. For example, a projected image may be controlled in a manner to reduce a variation in intensity of the image, such as may be caused by the axis of the projected light impinging the display surface at an oblique angle. The techniques may be applied to a projector system that projects light onto a projection display medium or other display surface. For example, the display surface may receive, reflect and scatter the light projected from a projector to present one or more images to one or more users. The techniques herein may determine a distance from the projector to a nearest or nearer portion the image and a distance from the projector to a farthest or farther portion of the image. Based at least in part on the determination of the closer distance and the farther distance, the intensity of the projected image may be controlled to reduce or eliminate noticeable variations in the perceived brightness of the displayed image. Additionally, in some implementations, the intensity of the projected image may be dynamically adjusted and equalized as a position, angle, location and/or shape of the display surface changes relative to the projector.

As one example, the intensity of the projected image may be controlled by use of a screen or filter in the projector. The filter may have multiple separately controllable areas, such as controllable on a per pixel basis, or other suitable level of granularity. The transparency of the controllable areas may be controlled incrementally between a first amount of transparency that allows light to pass, to a second amount of transparency that allows little or no light to pass. The filter may be placed in front of the projector lamp, backlight or other light source, such as at a location between the light source and the projector lens, either before or after one or more imaging components. The amount of light permitted to pass through each controllable area or pixel of the filter may be controlled to equalize the intensity of the light projected onto the display surface. As one example, the filter may be a grayscale liquid crystal panel that is positioned between the projector light source and one or more conventional color LCDs or other conventional projector imaging components. The amount of light passing through each area or pixel of the grayscale liquid crystal panel may be controlled by controlling the transparency of each area or pixel of the grayscale liquid crystal panel.

As another example, rather than using the filter described above, the image presentation information for the image may be changed based on the determined minimum distance and maximum distance. For example, in the case of a projector that employs a color LCD and a projector light source, adjustments to the intensity of a plurality of pixels may be determined and the information used for controlling the setting of each pixel may be adjusted or changed accordingly. In some cases, the intensity of the higher intensity portions of the image may be adjusted downward to a level that is approximately the same as the lowest intensity portions of the image.

The one or more images may be projected onto the display surface by a projection system. The projection systems described herein may be employed in a variety of environments such as conference rooms, classrooms, homes, offices, movie theaters, and so forth. Typical projection systems may include a projector configured to emit light focused toward a projection display surface. The display surface in turn is configured to reflect and scatter the projected light so that the projected image is presented to one or more users. The display surface may be fixed, such as in the case of a display surface that mounts to a wall, a table or a stand. Alternatively, or additionally, the display surface may be portable and freely repositionable, such as a handheld projection display screen.

In some examples, the projection systems described herein may be used in augmented reality environments that include systems of resources such as cameras, projectors, computing devices with processing and memory capabilities, and so forth, which may perform the processes described herein. The projectors may project images onto the surroundings that define the environment or may cause various operations to be performed within the environment. Moreover, cameras and microphones may monitor and capture user interactions with devices, and these inputs may be used, in part, to determine one or more images to present to particular users, such as to a user that has been determined to be at a particular location with respect to a particular display surface.

Some implementations may include an augmented reality functional node (ARFN) that is configured to dynamically accommodate motion and tilt in three-dimensional space. For example, a projector of the ARFN projects light onto a fixed or mobile projection display surface. In some cases, the display surface may be handheld and may change in one or both of its distance from the projector or its angle with respect to an optical axis between the projector and the display surface. In response to detecting a change in distance or angle of the display surface, the ARFN may dynamically perform a sequence of actions to accommodate the change and to control the intensity of the image.

First, the ARFN may determine the position of the display surface, and the distances to the nearest and farthest edge portions of the image to be projected. Next, based on the difference in the distances, the ARFN may determine an amount to adjust the intensity to provide uniform intensity across the image. The adjustment may be based on one or both of the determined distance and/or the determined angle of the display medium. The ARFN may calculate the adjustment based on the principle that the intensity of light decreases as function of the distance traveled squared. In some examples, the adjustment may be effectuated through use of a light filter or screen, such as one or more LCD panels. In other examples, the adjustment may be made by recalculating pixel information for the image. The projector of the ARFN may project light of the intensity equalized image onto the display surface. The projector may project the light before, during and/or after a dynamic adjustment in intensity due to a detected change in distance and/or angle of the display surface. In various examples, both the detecting and the dynamic adjustment or control may occur periodically or continuously. If periodically, the magnitude of the period may be based on a history of movement of the display surface.

FIG. 1 depicts an example environment 100 in which a projection display may be used. The environment 100 may include one or more projectors. In the illustrated example, at least one projector is included in an ARFN (augmented reality functional node). However, in other examples, the projector is not associated with an ARFN, but may instead be a stand-alone projector or a projector associated with a different type of projection system, display system, media system, computer system, gaming system, theater system, or the like. For example, the projectors and the display surfaces herein may be associated with any type of computing device, home electronics, consumer electronics, automotive electronics, commercial electronics, and so forth. Further, while a front projection system is shown in some examples, other examples may use a rear projection system, a light guided or edge-illuminated projection system, or any other suitable projection arrangement.

In FIG. 1, the environment 100 includes three ARFN 102 (1)-(3) shown within the room. Each ARFN 102 contains projectors, cameras, and computing resources that are used to generate the augmented reality environment 100. In this illustration, the first ARFN 102(1) is a fixed mount system that may be mounted within the room, such as mounted to the ceiling, although other placements are contemplated. The first ARFN 102(1) projects images onto the scene, such as onto a display surface 104(1) on a wall of the room. A first user 106 may watch and interact with the images projected onto the wall, and the ceiling-mounted ARFN 102(1) may capture that interaction. In addition, the ARFN 102(1) may detect a location of the user or actions taken by the user within the room (e.g., gestures) or sounds output by the user. In response, the ARFN 102(1) may identify operations associated with those locations, gestures or sounds and cause those operations to be performed within the room. The ARFN 102 (1) may further include one or more devices, such a camera, range finder, or the like, to detect a closest point or closer portion of the projected image and a furthest point or further portion of the projected image. One implementation of the first ARFN 102(1) is provided below in more detail with reference to FIG. 2.

A second ARFN 102(2) may be embodied to resemble a table lamp, which is shown sitting on a desk 108 in the example of FIG. 1. The second ARFN 102(2) projects one or more images 110 onto a display surface 104(2) of the desk 108, and the user 106 may view and interact with the projected images 110. The one or more projected images 110 may be of any number of things, such as homework, video games, news, recipes and so forth.

A third ARFN 102(3) is also embodied to resemble a table lamp, shown sitting on a small table 112 next to a chair 114. A second user 116 is seated in the chair 114, holding a user device 118. The third ARFN 102(3) projects images onto a display surface 104(3) of the user device 118 for the user 116 to consume and interact with the projected images. The projected images may be of any number of things, such as books, games (e.g., crosswords, Sudoku, etc.), news, magazines, movies, browser, etc. The user device 118 may be essentially any device for use within an augmented reality environment, and may be provided in several form factors. The user device 118 may range from an entirely passive, non-electronic, mechanical surface to a fully functioning, fully processing, electronic device with a projection display surface. For instance, the user device 118 may be a display surface or display medium that includes one or more features with which the user may interact.

In the example illustrated in FIG. 1, the images projected onto any of the display surfaces 104(1)-104(3) may be adjusted or controlled to provide uniform light intensity of an image as described herein. Further, the examples illustrated are just sample locations and implementations. In other implementations, one or more ARFNs may be placed around the room in any number of arrangements, such as in or on furniture, on a wall, on the floor, beneath a table, and so forth.

Associated with each ARFN 102(1)-(3), or with a plurality of ARFNs 102, is a computing device 120, which may be located within the augmented reality environment 100 or disposed at another location external to the environment 100. Each ARFN 102 may be connected to the computing device 120 via a wired network, a wireless network, or a combination of the two. The computing device 120 has a processor 122, an input/output interface 124 and a memory 126. The processor 122 may include one or more processors configured to execute instructions. The instructions may be stored in memory 126, or in other memory accessible to the processor 122, such as storage in cloud-based resources.

The input/output interface 124 may be configured to couple the computing device 120 to other components, such as projectors, cameras, microphones, other ARFNs, other computing devices, and so forth. The input/output interface 124 may further include a network interface 128 that facilitates connection to a remote computing system, such as cloud computing resources. The network interface 128 enables access to one or more network types, including wired and wireless networks. More generally, the coupling between the computing device 120 and any components may be via wired technologies (e.g., wires, fiber optic cable, etc.), wireless technologies (e.g., RF, cellular, satellite, Bluetooth®, etc.), or other connection technologies.

The memory 126 may include computer-readable storage media ("CRSM"). The CRSM may be any available physical media accessible by a computing device to implement the instructions stored thereon. CRSM may include, but is not limited to, random access memory ("RAM"), read-only memory ("ROM"), electrically erasable programmable read-only memory ("EEPROM"), flash memory or other memory technology, compact disk read-only memory ("CD-ROM"), digital versatile disks ("DVD") or other optical disk storage, magnetic cassettes, magnetic tape, magnetic disk storage or other magnetic storage devices, or any other medium that can be used to store the desired information and which can be accessed by a computing device.

Several modules such as instructions, datastores, and so forth may be stored within the memory 126 and configured to execute on a processor, such as the processor 122. An operating system module 130 is configured to manage hardware and services within and coupled to the computing device 120 for the benefit of other modules.

A spatial analysis module 132 is configured to perform several functions, which may include analyzing a scene to generate a topology, recognizing objects in the scene, dimensioning the objects, and creating a three-dimensional (3D) model of the scene. Characterization may be facilitated using several technologies including structured light, light detection and ranging (LIDAR), optical time-of-flight, ultrasonic ranging, stereoscopic imaging, radar, and so forth either alone or in combination with one another. For convenience, and not by way of limitation, some of the examples in this disclosure refer to structured light, although other techniques may be used. The spatial analysis module 132 provides the information used within the augmented reality environment to provide an interface between the physicality of the scene and virtual objects and information. Accordingly, in some examples, the spatial analysis module may determine the distance from an ARFN to the closest portion and farthest portion of a projected image, and/or to the closest portion and furthest portion of a display surface. For instance, in the case of a movable or portable display surface, the ARFN may track one or more edges of the display surface for determining a distance from the projector to a closest edge and a distance from the projector to a farthest edge. The distance information may then be used for controlling the intensity of the projected image.

A system parameters datastore 134 is configured to maintain information about the state of the computing device 120, the input/output devices of the ARFN 102, and so forth. For example, system parameters may include current pan and tilt settings of the cameras and projectors, an orientation of a projector toward a display surface, distances from the projector to the display surface, and so forth. As used in this disclosure, the datastore includes lists, arrays, databases, and other data structures used to provide storage and retrieval of data.

An object parameters datastore 136 in the memory 126 is configured to maintain information about the state of objects within the scene. The object parameters may include the surface contour of the object, overall reflectivity, color, and so forth. This information may be acquired from the ARFN 102, other input devices, or via manual input and stored within the object parameters datastore 136.

An object datastore 138 is configured to maintain a library of pre-loaded reference objects. This information may include assumptions about the object, dimensions, and so forth. For example, the object datastore 138 may include a reference object of a beverage can and include the assumptions that beverage cans are either held by a user or sit on a surface, and are not present on walls or ceilings. The spatial analysis module 132 may use this data maintained in the datastore 138 to test dimensional assumptions when determining the dimensions of objects within the scene. In some implementations, the object parameters in the object parameters datastore 136 may be incorporated into the object datastore 138. For example, objects in the scene that are temporally persistent, such as walls, a particular table, particular users, and so forth may be stored within the object datastore 138. The object datastore 138 may be stored on one or more of the memory of the ARFN, storage devices accessible on the local network, or cloud storage accessible via a wide area network.

In addition, the object datastore 138 may maintain a library of sounds or particular frequencies that are associated with different operations that may be performed within the environment. As a result, upon one of the ARFNs 102 detecting a particular sound or frequency within the environment, the ARFN may identify a corresponding operation (e.g., adjust volume, project an image to a particular display surface, etc.) and then cause that operation to be performed.

A user identification and authentication module 140 is stored in memory 126 and executed on the processor(s) 122 to use one or more techniques to verify users within the environment 100. In one implementation, the ARFN 102 may capture an image of the user's face and the spatial analysis module 132 reconstructs 3D representations of the user's face. Rather than 3D representations, other biometric profiles may be computed, such as a face profile that includes key biometric parameters such as distance between eyes, location of nose relative to eyes, etc. In such profiles, less data is used than full reconstructed 3D images. The user identification and authentication module 140 can then match the reconstructed images (or other biometric parameters) against a database of images (or parameters), which may be stored locally or remotely on a storage system or in the cloud, for purposes of authenticating the user. If a match is detected, the user is permitted to interact with the system.

An augmented reality module 142 is configured to generate augmented reality output in concert with the physical environment. In some examples, the augmented reality module 142 may employ essentially any surface, object, or device within the environment 100 to interact with the users. The augmented reality module 142 may be used to track items within the environment that were previously identified by the spatial analysis module 132. The augmented reality module 142 includes a tracking and control module 144 configured to track one or more items within the scene and accept inputs from or relating to the items.

In addition, and as stated above, the memory 126 may maintain, or may be otherwise associated with, a detection module 146. As shown, the detection module 146 may include an audio detection module 148 and an image detection module 150. In various implementations, a user 106 may interact with the environment for the purpose of causing one or more operations to be performed within the environment. For example, the audio detection module 148 may detect (e.g., via a microphone) sounds or voice commands. Further, the image detection module 150 may detect one or more actions or gestures performed by the user 106 via a camera (e.g., a still image camera or a video camera).

Upon detecting the particular output by a user or the user device 118, a processing module 152 may determine one or more operations that are associated with the detected output. In particular, the ARFN 102 may maintain or be associated with a database that maps various sounds, frequencies, and/or user actions to particular operations that may be performed within the environment. That is, in response to the user 106 performing some action, the processing module 152 may identify a specific operation. If a desired display surface 104 for receiving a projected image has been identified by the processing module 152, the presentation module 154 may cause projection of a particular image or images onto the display surface. Accordingly, the presentation module 154 may cause an image to be projected, which may be caused by a user interacting with the environment. Further, the presentation module may adjust the projected image to equalize the intensity of the image according the techniques described herein, regardless of the location or position of the display surface within the environment 100.

Figure 2:
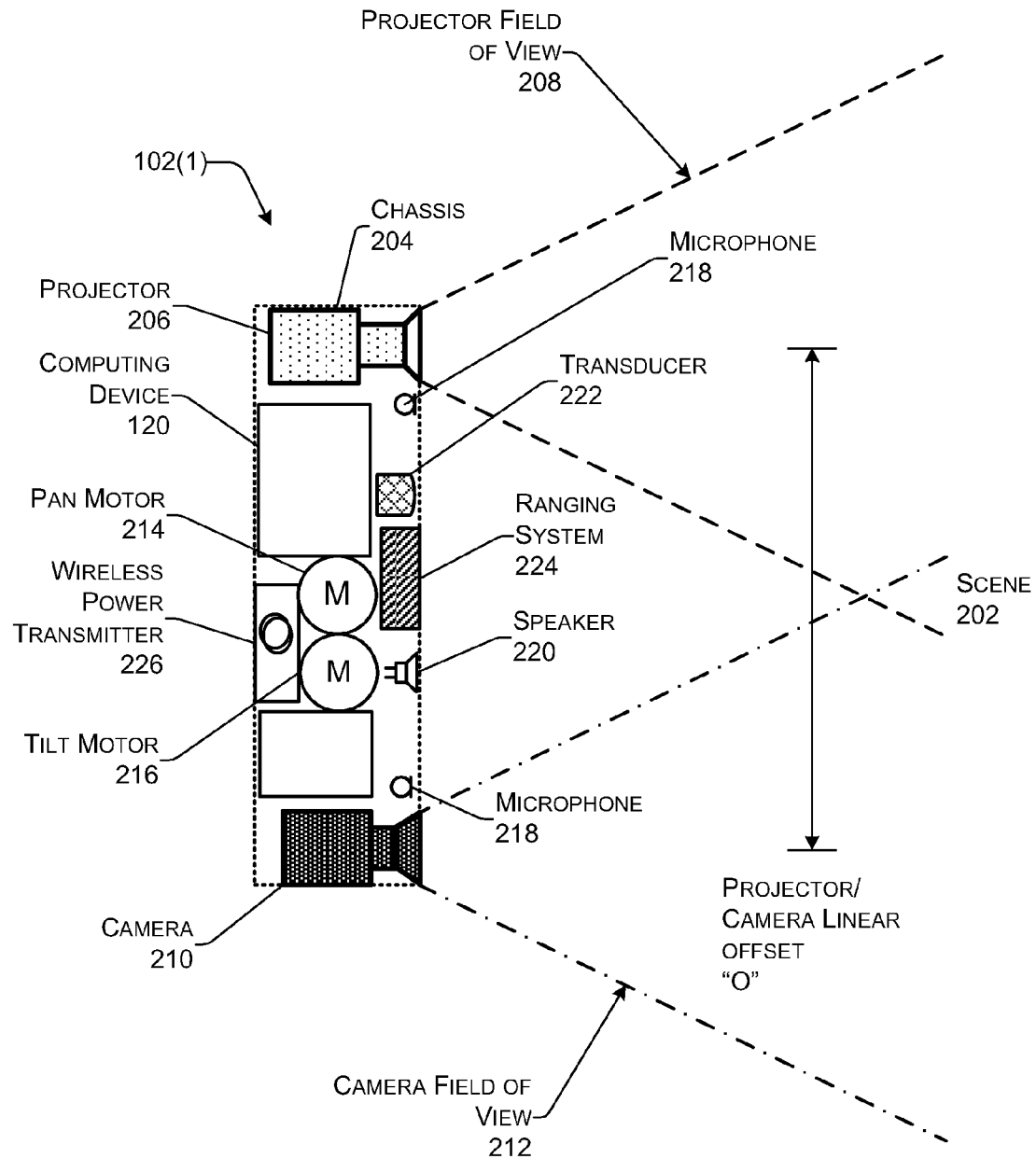
FIG. 2 illustrates an implementation of a projection and image capturing system including a projector and a camera in spaced relation to one another. In this implementation, the projector and the camera have different optical paths.

FIG. 2 shows an illustrative schematic 200 of the first augmented reality functional node 102(1) and selected components. The first ARFN 102(1) is configured to scan at least a portion of a scene 202 and the objects therein. The ARFN 102(1) may also be configured to provide augmented reality output, such as images, sounds, and so forth.

A chassis 204 holds the components of the ARFN 102(1). Within the chassis 204 may be disposed a projector 206 that generates and projects images into the scene 202. These images may be visible light images perceptible to the user, visible light images imperceptible to the user, images with non-visible light, or a combination thereof. This projector 206 may be implemented with any number of technologies capable of generating an image and projecting that image onto a surface within the environment. Suitable technologies include a digital micromirror device (DMD), liquid crystal on silicon display (LCOS), liquid crystal display (LCD), 3LCD, and so forth. The projector 206 has a projector field of view 208 that describes a particular solid angle. The projector field of view 208 may vary according to changes in the configuration of the projector. For example, the projector field of view 208 may narrow upon application of an optical zoom to the projector. In some implementations, a plurality of projectors 206 may be used. Further, in some implementations, the projector 206 may be further configured to project patterns, such as non-visible infrared patterns, that can be detected by camera(s) 210 and used for 3D reconstruction and modeling of the environment. The projector 206 may comprise a micro-laser projector, a digital light projector (DLP), cathode ray tube (CRT) projector, liquid crystal display (LCD) projector, light emitting diode (LED) projector or the like.

A camera 210 may also be disposed within the chassis 204. The camera 210 is configured to image the scene in visible light wavelengths, non-visible light wavelengths, or both. The camera 210 may be implemented in several ways. In some instances, the camera 210 may be embodied as a red, green, blue (RGB) camera 210. In other instances, the camera 210 may include time of flight (ToF) sensors. In still other instances, the camera 210 may be a red, green, blue, z-depth (RGBZ) camera 210 that includes both ToF and RGB sensors. The camera 210 has a camera field of view 212, which describes a particular solid angle. The camera field of view 212 may vary according to changes in the configuration of the camera 210. For example, an optical zoom of the camera 210 may narrow the camera field of view 212. In some implementations, a plurality of cameras 210 may be used.

The chassis 204 may be mounted with a fixed orientation, or be coupled via an actuator to a fixture such that the chassis 204 may move. Actuators may include piezoelectric actuators, motors, linear actuators, and other devices configured to displace or move the chassis 204 or components therein such as the projector 206 and/or the camera 210. For example, in one implementation, the actuator may comprise a pan motor 214, tilt motor 216, and so forth. The pan motor 214 is configured to rotate the chassis 204 in a yawing motion. The tilt motor 216 is configured to change the pitch of the chassis 204. By panning and/or tilting the chassis 204, different views of the scene may be acquired. The spatial analysis module 132 may use the different views to monitor objects within the environment.

One or more microphones 218 may be disposed within the chassis 204, or elsewhere within the scene. These microphones 218 may be used to acquire input from the user, for echolocation, location determination of a sound, or to otherwise aid in the characterization of and receipt of input from the scene and/or the user device 118. For example, the user may make a particular noise, such as a tap on a wall or snap of the fingers, which are pre-designated to initiate an augmented reality function. The user may alternatively use voice commands. The user may also interact with the user device 118, which may cause the user device 118 to output particular sounds or frequencies. Such audio inputs may be located within the scene using time-of-arrival differences among the microphones and used to summon an active zone within the augmented reality environment. Further, the microphones 218 may be used to receive voice input from the user for purposes of identifying and authenticating the user.

One or more speakers 220 may also be present to provide for audible output. For example, the speakers 220 may be used to provide output from a text-to-speech module, to playback pre-recorded audio, etc.

A transducer 222 may be present within the ARFN 102(1), or elsewhere within the environment, and configured to detect and/or generate inaudible signals, such as infrasound or ultrasound. The transducer 222 may also employ visible or non-visible light to facilitate communication. These inaudible signals may be used to provide for signaling between accessory devices and the ARFN 102(1).

A ranging system 224 may also be provided in the ARFN 102 to provide distance information from the ARFN 102 to an object or set of objects. The ranging system 224 may comprise radar, light detection and ranging (LIDAR), ultrasonic ranging, stereoscopic ranging, one or more interferometers, and so forth. In some implementations, the transducer 222, the microphones 218, the speaker 220, or a combination thereof may be configured to use echolocation or echo-ranging to determine distance and spatial characteristics. Further, any one of, or any combination of, the ranging system 224, the transducer 222, the camera 210, or other components of the ARFN may be used to determine the nearest portions and farthest portions of an image and/or a display surface according to the implementations herein.

A wireless power transmitter 226 may also be present in the ARFN 102, or elsewhere within the augmented reality environment. The wireless power transmitter 226 is configured to transmit electromagnetic fields suitable for recovery by a wireless power receiver and conversion into electrical power for use by active components in other electronics, such as non-passive user device 118. The wireless power transmitter 226 may also be configured to transmit visible or non-visible light to communicate power. The wireless power transmitter 226 may utilize inductive coupling, resonant coupling, capacitive coupling, and so forth.

In this illustration, the computing device 120 is shown within the chassis 204. However, in other implementations all or a portion of the computing device 120 may be disposed in another location and coupled to the ARFN 102(1). This coupling may occur via wire, fiber optic cable, wirelessly, or a combination thereof. Furthermore, additional resources external to the ARFN 102(1) may be accessed, such as resources in another ARFN accessible via a local area network, cloud resources accessible via a wide area network connection, or a combination thereof.

The ARFN 102(1) is characterized in part by the offset between the projector 206 and the camera 210, as designated by a projector/camera linear offset "O." This offset is the linear distance between the projector 206 and the camera 210. Placement of the projector 206 and the camera 210 at distance "O" from one another may aid in the recovery of structured light data from the scene. The known projector/camera linear offset "O" may also be used to calculate distances, dimensioning, and otherwise aid in the characterization of objects within the scene 202. In other implementations, the relative angle and size of the projector field of view 208 and camera field of view 212 may vary. In addition, the angle of the projector 206 and the camera 210 relative to the chassis 204 may vary or may be variable by actuators.

Due to this offset "O," the projector 206 and camera 210 employ separate optical paths. That is, the projector 206 employs a set of lenses to project images along a first optical path therein, and the camera 210 employs a different set of lenses to image the scene by capturing the light scattered by the surroundings.

In other implementations, the components of the ARFN 102(1) may be distributed in one or more locations within the environment 100. As mentioned above, microphones 218 and speakers 220 may be distributed throughout the scene. The projector 206 and the camera 210 may also each be located in separate chassis 204.

Figure 3:
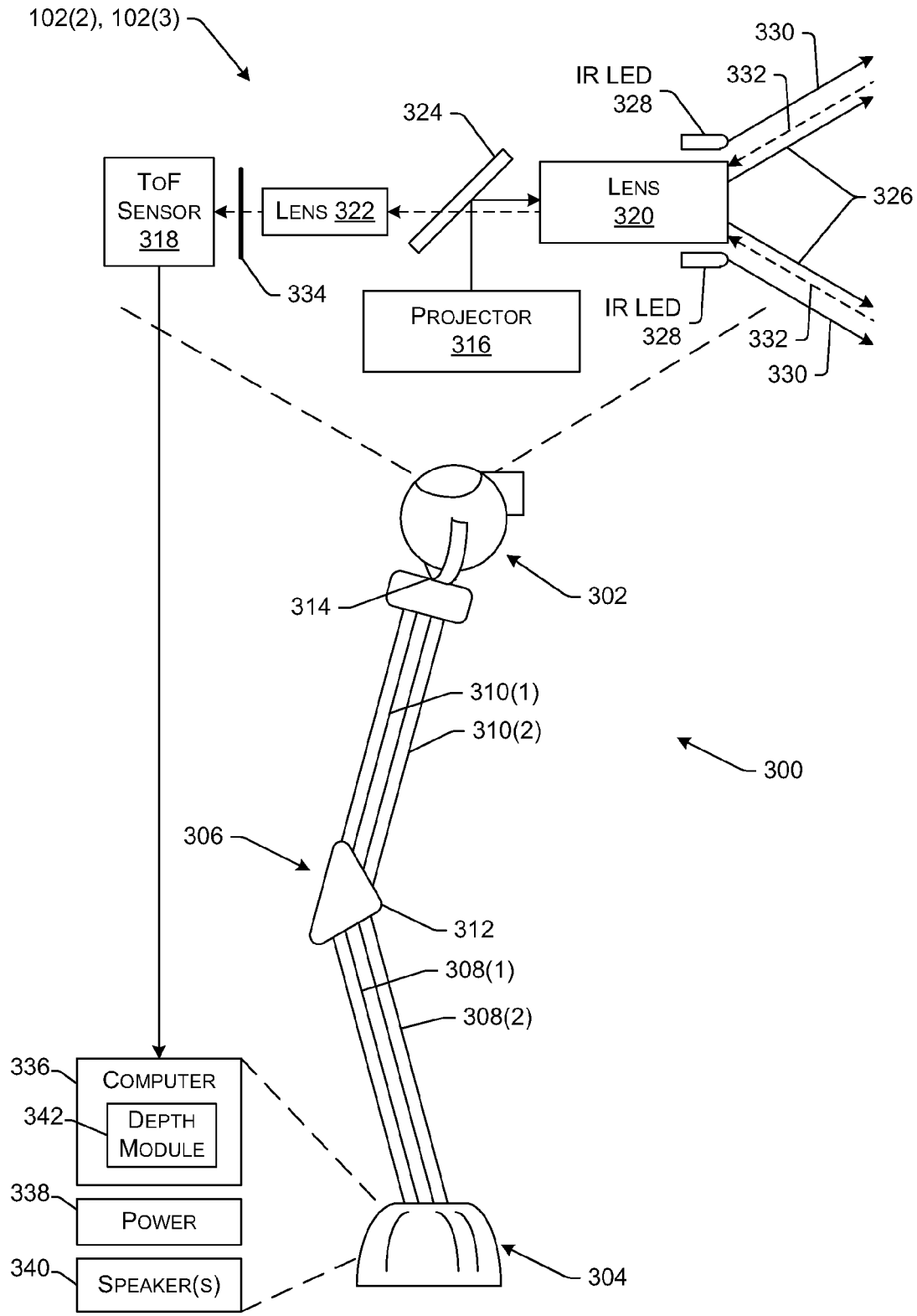
FIG. 3 illustrates an implementation of a projection and image capturing system formed as a familiar type of furniture, such as a table lamp. In this implementation, the projector and camera may share a common optical path through a common lens.

FIG. 3 illustrates one implementation of the ARFN 102(2) or 102(3), implemented as part of a table lamp, although it may be incorporated into other familiar types of furniture. Further, the optical components described in this implementation may be embodied in a non-furniture arrangement, such as a standalone unit placed in the room or mounted to the ceiling or walls (i.e., similar to the ARFN 102(1) described above), or incorporated into fixtures such as a ceiling light fixture. The table lamp 300 has a head 302 attached to a base 304 by a movable arm mechanism 306. As illustrated, the arm mechanism 306 has two base members or rods 308(1) and 308(2) connected to two head members or rods 310(1) and 310(2) via a joint connector 312. Other configurations of the arm mechanism 306 may be used. In the illustrated implementation, the head 302 is connected to the arm mechanism 306 via a universal connector 314 that enables at least two degrees of freedom (e.g., along tilt and pan axes). The universal connector 314 is described below in more detail with reference to FIG. 6. In other implementations, the head 302 may be mounted to the arm mechanism 306 in a fixed manner, with no movement relative to the arm mechanism 306, or in a manner that enables more or less than two degrees of freedom. In still another implementation, a pan may be coupled to the base 304 to enable rotation of the arm mechanism 306 and the head 304.

The head 302 holds several components, including a projector 316 and a ToF sensor 318. In this example, the ToF sensor 318 measures IR signal reflections from objects within the scene. The ToF sensor 318 may be implemented as a standalone sensor, or as part of a camera 210. The head 302 also contains one or more lenses, including a first lens 320 and a second lens 322. The first lens 320 may be implemented in a number of ways, including as a fixed lens, wide angle lens, or as a zoom lens. When implemented as a zoom lens, the lens may have any zoom range, with one example being 17-50 mm. Use of a zoom lens also offers additional advantages in that a zoom lens permits a changeable field of view, which can increase pixel resolution for better gesture recognition. Further, by zooming in, the device can decrease the field of view and enable the ability to discern fingers that were not resolved in non-zoomed (larger field of view) state. The lens 320 may further include a motorized focus, a motorized zoom, and a motorized iris.

The second lens 322 is provided to adjust for the differences between the projection imager and the ToF imager. This allows for the device to set relative coverage of the two imagers (e.g., overscan/underscan).

The projector 316 projects an image that is reflected off an angled beam splitter 324 and out through the lens 320. For example, the beam splitter 324 may be embodied as a dichroic beam splitter having a coated prism assembly that employs dichroic optical coatings to divide light. The projected image has a field of view represented by the outgoing pair of arrows 326. In this manner, the visible and high intensity light from the projector can be zoomed for image projection on a wide range of surfaces, from near view to far view surfaces.

One or more IR emitters 328, such as IR LEDs, are positioned in the head 302 relative to the lens 320. The IR emitters 328 direct IR light in the direction of the projected image to illuminate the scene onto which the images are being projected. The IR emitters 328 may be arranged such that the illumination field is wider than the projected field, as represented by the outgoing pair of arrows 330, and as further described with respect to FIG. 5 below.

The IR signals are scattered from objects in the scene and returned to the lens 320, as represented by the incoming pair of arrows 332. The captured IR signals are passed through the lens 320 and through the dichroic beam splitter 324 to the secondary lens 326. The IR signals are then optionally passed through an IR filter 334 (or other filter type) to the ToF sensor 318. In other implementations, the IR signals may be passed directly from the lens 322 to the ToF sensor 318, without going through the IR filter 334. Accordingly, the IR signals are emitted out from the head 302, scattered by the objects, and collected by the head 302 for capture by the ToF sensor 318 as a way to image the scene. This technique is performed in lieu of using structured light, as implemented in the implementation of the first ARFN 102(1).

It is noted that, in other implementations, the projector 316 may be arranged to project an image that is passed through the beam splitter 324 and out through the lens 320, rather than being reflected by the beam splitter 324. In this arrangement, the returning IR signals maybe received back through the lens 320 and reflected by the beam splitter 324 to the lens 322 and ToF sensor 318. Said another way, the projector 316 and IR components (i.e., ToF sensor 318, lens 322 and optionally filter 334) may be swapped so that the returning IR signals are reflected by the beam splitter 324 rather than the projected image. Other arrangements may also be possible where at least part of the optical path is shared by the projection and depth capture.

The lamp-based ARFN 102(2) or 102(3) may also be equipped with one or more components in the base 304. In this example, a computer 336 resides in the base 304, along with power components 338 and one or more speakers 340. The computer may include processing and memory to execute instructions. A depth module 342 may be executed by the computer 336 to measure a time of flight for an IR signal (or other modulated light output). The time-of-flight value may be derived as a function of a time elapsed between emission from an IR LED 328 and capture by the ToF sensor 318. Alternatively, the time-of-flight value may be derived as a function of the phase difference between the modulated light output and the returned light. The depth module 342 may be implemented in software or hardware. It is noted that in other implementations, the components shown as residing in the base 304 may reside in the head 302 or arm mechanism 306. For instance, the computer 336 may be located in the head 302, and the speakers may be 340 may be distributed in multiple locations, including the base, arm mechanism, and/or the head. Additionally, in some implementations, any of the components described above, such as the ranging system 224, the transducer 222, the separate camera 210, or other components may be included in the ARFN of FIG. 3.

In the implementation of FIG. 3, the projector 316 and the sensor 318 share a common optical path through a common lens 320. As a result, the ARFN may be made more compact to a smaller form factor, as one set of lenses are removed in this design as compared to the offset design discussed above with respect to FIG. 2.

Figure 4:
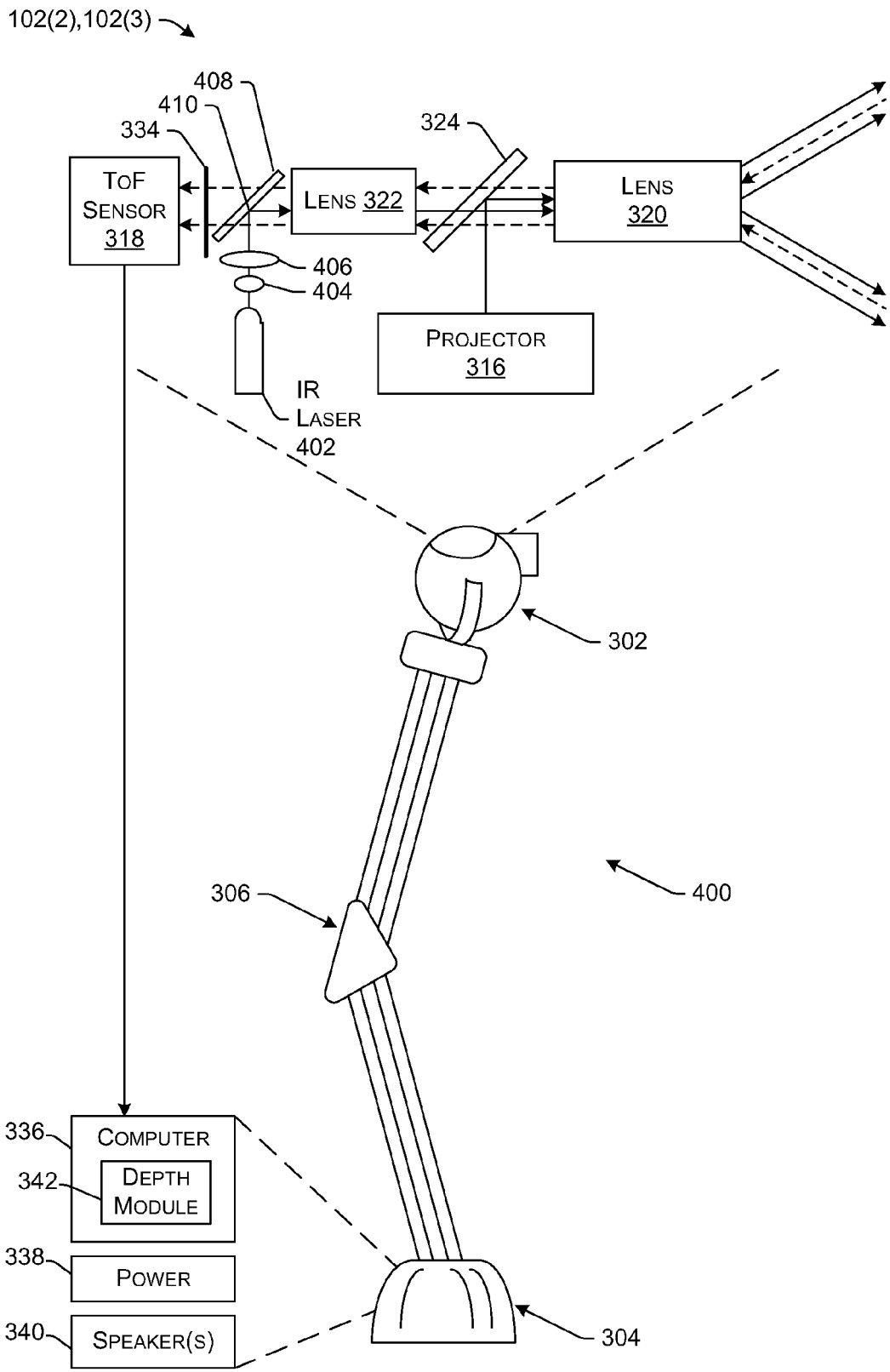
FIG. 4 illustrates an implementation of a projection and image capturing system formed as a table lamp similar to the implementation illustrated in FIG. 3. In this example, the projector and camera may share a common optical path through a common lens, and one or more illumination components may also share the same optical path.

FIG. 4 illustrates another implementation of the ARFN 102(2) or 102(3), also shown implemented as part of a table lamp 300. This implementation differs from that of FIG. 3 in that the illumination system also shares the same optical path as the projector 316 and the ToF sensor 318.

In FIG. 4, an IR laser 402 is used in place of the IR LEDs 328 of FIG. 3. The IR laser 402 outputs an IR beam that is expanded by a beam expander 404 and then concentrated by a focus lens 406 onto an angled beam splitter 408. In one implementation, the angled beam splitter 408 is formed of a material that passes light (e.g., glass) and has a reflective patch 410 at its center. The focus lens 406 concentrates the IR beam onto the reflective patch 410 of the beam splitter 408, which directs the beam through lens 322, through the beam splitter 324, and out through the lens 320. The reflective patch covers the center portion of the beam splitter 408 and may have any number of shapes, such as circular, oval, polygonal, and so forth. With this arrangement, the size and area of interest can be controllably illuminated by use of the lens 320 and modulated IR laser light. The illuminated area may be roughly the same size, or slightly larger, than the area onto which images are projected, as is described with reference to FIG. 5 below.

IR signals scattered from a populated landscape are then collected by the head 302 and passed back through the lens 320, through the beam splitter 324, through lens 322, through the non-reflective portion of the angled reflector 408, through the filter 334, and to the ToF sensor 318. Accordingly, the collected scattered IR light may form an image on the ToF sensor 318. The image may be used to compute time of flight values for depth analysis of the landscape of the scene.

One of the advantages of placing the IR laser 402 as shown and passing the IR beam through the lens system is that the power used for illumination may be reduced as compared to the implementation of FIG. 3, where the IR LEDs are external to the optical path. Illumination typically degrades inversely proportional to the square of the distance. In FIG. 3, the forward and return paths result in an illumination inversely proportional to the distance to the power of four. Conversely, illumination through the same lens means that the returned light is inversely proportional to square of the distance, and therefore can use less intense illumination to achieve the same results.

Further, essentially any IR device may be used in the systems herein. Although IR LEDs and IR lasers are shown in the implementations of FIGS. 3 and 4, essentially any device that produces energy within the IR spectrum may be used, such as, for example, a regular red LED. Additionally, in some implementations, any of the components described above, such as the ranging system 224, the transducer 222, the separate camera 210, or other components may be included in the ARFN of FIG. 4.

Both implementations of the integrated projection and camera system afford advantages in addition to a smaller form factor. The projection and camera system allows for simultaneous and coaxial operation of the following functions: (1) visible light high intensity zoomable image projection; (2) illumination of a controlled area of interest with modulated IR light; and (3) collection of scattered IR light from a populated landscape to form an image on a time-of-flight camera/sensor.

Figure 5:
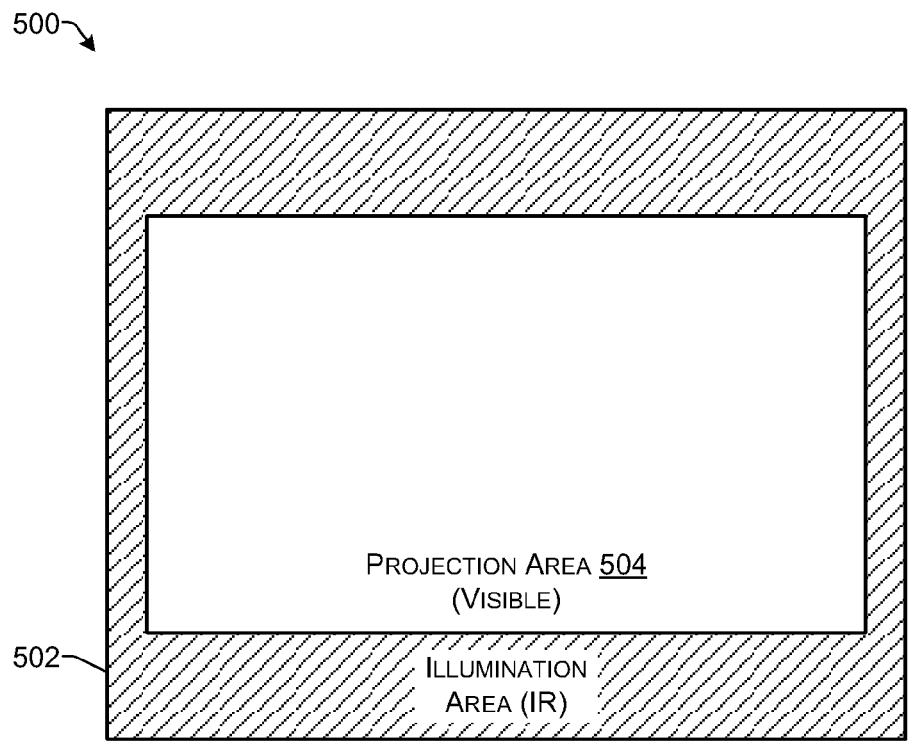
FIG. 5 illustrates a first area of illumination and a second area of image capture that may be realized by the lamp examples illustrated in FIGS. 3 and 4.

FIG. 5 shows a coverage pattern 500 provided by the ARFN 102(2) or 102(3). The coverage pattern 500 has an illumination area 502 covered by the IR-based illumination system. The coverage pattern 500 also has a projection area 504 covered by the projected image. As shown in this footprint, the illumination area 502 is larger than, and encompasses, the projection area 504. However, in other implementations, the illumination area 502 may be equal to or smaller than, and be encompassed by, the projection area 504. The second lens 322 in the device allows for adjustment in the relative coverage to enable overscan or underscan conditions.

Figure 6:
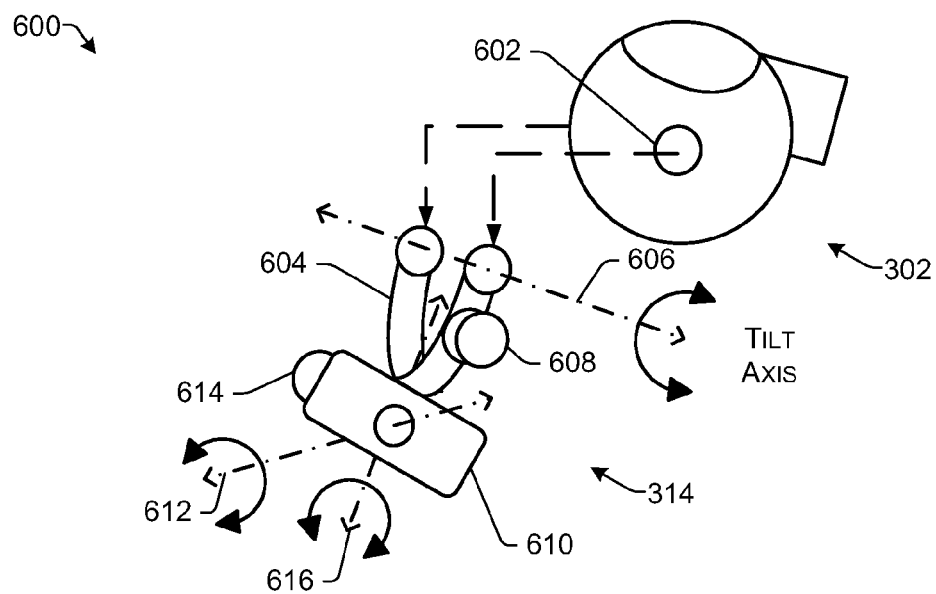
FIG. 6 shows an exploded view of a head and universal mount of the lamp examples illustrated in FIGS. 3 and 4.

FIG. 6 shows an exploded view 600 of the head 302 and the universal mount 314 of the lamp implementation shown in FIGS. 3 and 4. Here, the head 302 is generally spherical, although it may be made of any shape, size or form factor. The head 302 has two mounting members 602 on opposing sides of the sphere. The mounting members 602 may be pivotally mounted within a U-shaped cradle 604 to facilitate rotation about a tilt axis 606. A tilt motor 608 may be included to move the head 302 about the tilt axis 606.

The U-shaped cradle 604 is movably mounted relative to structural bracket 610. The U-shaped cradle 604 may be pivoted about a pan axis 612. A pan motor 614 may be included to pivot the U-shaped cradle 604 and head 302 about the pan axis 612. Additionally, the U-shaped cradle 604 may be rotatable about an axis 616 to rotate or spin relative to the structural bracket 610.

Figure 7:
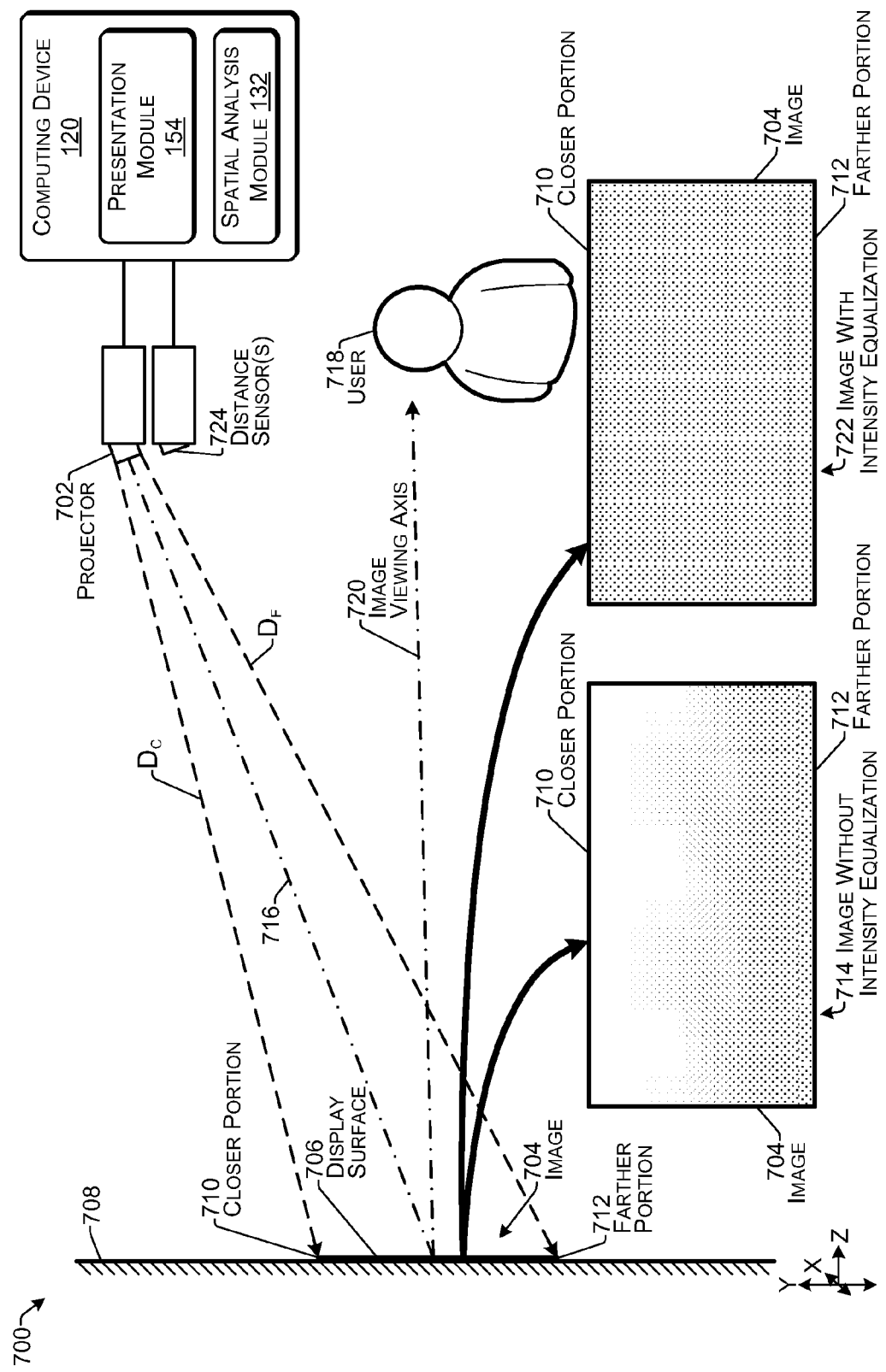
FIG. 7 illustrates an example projection system with intensity equalization according to some implementations.

FIG. 7 illustrates an example of a system 700 that includes a projector 702 for projecting one or more images 704 onto a display surface 706 according to some implementations. In this example, the display surface 706 may be an area of, or may be located on, a support 708. In some cases, the support 708 may be a wall, stand, table, floor, ceiling or any other suitable structure. In other cases, the support 708 may be a portable support or portable display surface, such as part of a mobile or portable device. The device 118 discussed above with respect to FIG. 1 is an example of a portable device that may receive and display a projected image.

The display surface 706 may be any suitable surface capable of receiving and reflecting light projected from the projector 702 to display the image 704. In some examples, the display surface 706 may be a display medium such as a reflective sheet of a projection screen material, which may include screens coated with magnesium carbonate, titanium dioxide or other bright reflective material. In other examples, the display surface may be a reflective, lenticular or microfaceted material, such as acrylic or glass, which provides superior directional display characteristics. In still other examples, the display surface may merely be a surface of a wall, a table, a ceiling, a floor, or any other suitable surface, and may not necessarily be a flat surface, but may be a curved surface, a patterned surface, an irregular surface, or the like. For example, the display surface may include at least a portion having a curvature, such as in the shape of a concave or convex cylinder, hemisphere, etc. In such a case, the techniques herein may be used to equalize the intensity of the light projected along the curvature of the surface. Further, the image 704 may be a still image, i.e., a single frame, or a moving image, such as a video that includes multiple frames displayed sequentially.

The apparent brightness of an illuminated surface is the perception elicited in a viewer by the luminance of the surface. In general, the intensity of the light projected from the projector 702 may be expressed an as a function of the inverse of the distance traveled squared. In other words, the intensity of the light decreases as a function of the distance traveled squared. Accordingly, light reflected from a closest or closer portion 710 of the image 704 has a greater intensity, and appears brighter, than light reflected from a farthest or farther portion 712 of the image 704.

As illustrated at 714, which shows the image 704 rotated 90 degrees about the y-axis, when light is projected onto the display surface 706 along an oblique projection axis 716 (i.e., at a non-perpendicular angle) without intensity equalization, the closer portion 710 of the image 704 may appear brighter than the farther portion 712. For example, to a user 718 that is positioned to have an image viewing axis 720 that is approximately perpendicular to the display surface 706, the upper portion of the image 704 may appear brighter (i.e., having greater intensity) than the lower portion of the image 704. Thus, the image at 714, without intensity equalization, may have a visible gradient in perceived brightness or luminous intensity, which is lighter at the closer portion 710 (i.e., closer to the projector 702), and which gets darker toward the farther portion 714 (i.e., farther from the projector 702).

On the other hand, as illustrated at 722, when the intensity equalization herein is employed, the gradient or variation in brightness can be reduced or visibly eliminated. For example, the intensity of the reflected light is equalized or modified by the techniques and arrangements employed herein, which may reduce the intensity of the light projected for the closer portion 710 of the image 704 or increase the intensity of the light projected for the farther portion 712 of the image 704. Thus, to the user 718, the intensity (or perceived brightness) of the image 704 may be equalized or made uniform across the image 704 so that there is no noticeable gradient or variation in intensity from the farther portion 712 to the closer portion 710.

As discussed above, one or more distance sensors 724, such as time of flight (ToF) sensors, range sensors, transducers, interferometers, cameras, or the like, may be used to determine the position of the display surface 706 and the image 704 relative to the projector 702. For example, the distance sensors 724 may determine a first distance $D_e$ from the projector to the closer portion 710 of the image 704 (or to the closer portion of the display surface 706 upon which the image is projected). The distance sensors 724 may further determine a second distance $D_f$ from the projector to the farther portion 712 of the image 704 (or to the farther portion of the display surface 706 upon which the image is projected). Suppose in the example of FIG. 7 that the projector 702 is centrally aligned with the projected image 704 and perpendicular with respect to the x-axis (i.e., the axis going into and out of the page. Further, suppose that the projector 702 is off center from the image 704 in the direction of the y-axis. Accordingly, as illustrated at 714, due to the oblique angle of the projection axis 716 the intensity of the displayed image 704 will vary due to the differences in the first distance $D_e$ between the projector and the closer portion 710, and the second distance $D_f$ between the projector and the farther portion 712.

As discussed above with respect to FIG. 1, the computing device 120, or other suitable computing device, may be associated with the projector 702 and the distance sensor(s) 724. For example, the spatial analysis module 132 may receive sensor information from the distance sensors 724 for determining the distances $D_e$ and $D_f$. Alternatively, such as in the case of a fixed projector 702 and a fixed display surface 706, the distances $D_e$ and $D_f$ may have been provided by a user, stored in the memory of the computing device 120, or may have been determined or provided by any other suitable means, and in such a situation, the distance sensors 724 may not be eliminated or may not be used.

Many televisions, computer displays, and projectors produce colors by combining red, green, and blue (RGB) light in varying intensities, also referred to as the RGB additive primary colors. The resulting mixtures in the RGB color space (or sRGB color space) can reproduce a wide variety of colors (called a gamut). For example, an RGB color space may be expressed as three values ranging from 0-255, one value each for controlling the addition of each of the red, green and blue primary colors. Thus, for a typical projector, the image information for each pixel of the image may be expressed as a triple of three numeric values, e.g., (0-225, 0-255, 0-255) corresponding to (R, G, B). Further, while an additive RGB color space/model is used in some of the examples herein, any suitable color space or model may be used, depending at least in part on the projector hardware configuration, the display medium, and the content to be displayed. For example, a subtractive color space, such as one incorporating the CMYK (cyan, magenta, yellow, key) color model, may be used in some implementations.

In some examples herein, an algorithm for controlling and equalizing the intensity of individual pixels may be applied directly to the RGB values based on the difference between $D_e$ and $D_f$. In other implementations, the RGB values of the individual pixels of the image 704 may be converted to a different color space for applying intensity equalization to one or more portions of the image 704.

As one example, the HSL (Hue, Saturation, Luminosity (or Lightness)) color space employs a cylindrical-coordinate representation of points in an RGB color model. The HSL representation rearranges the geometry of RGB into a cylinder such that the angle around the central vertical axis corresponds to "hue," the distance from the axis corresponds to "saturation", and the distance along the axis corresponds to "luminosity" or "lightness," which also corresponds to the perceived brightness, and thus is directly related to the intensity of the light. Thus, by converting the RGB values of the pixels in the image 704 to HSL values, the luminosity portion of the HSL values may be adjusted or changed to equalize the intensity of the image based on the determined difference between $D_e$ and $D_f$. As another example, the HSV (Hue, Saturation, Value) color space may be used in a manner similar to the HSL color space.

Other examples of suitable color spaces according to some implementations herein include the YCbCr and Y'CbCr family of color spaces. In the Y'CbCr color space, Y' is the luma component and Cb and Cr are the blue-difference and red-difference chroma components. Y' (with prime, i.e., luma) is distinguished from Y, which is luminance. In the YCbCr color space, the light intensity is nonlinearly encoded based on gamma corrected RGB primaries used.

Additional examples of suitable color spaces according to some implementations include the CIE family of color spaces, such as CIE 1931 XYZ. In the CIE 1931 XYZ color space, Y is a luminance value, Z is quasi-equal to blue stimulation (i.e., the S cone response of the human eye), and X is a mix (e.g., a linear combination) of cone response curves chosen to be nonnegative. Accordingly, the Y value of the CIE color space may be adjusted or controlled for equalizing the intensity of the projected light.

As mentioned above, the intensity of projected light incident on a display surface may decrease as a function of the distance traveled squared. Thus, the presentation module 154 may calculate the adjustment to the intensity of one or more portions of the image 704 based on the following formula:

$$I_f/D_f^2 = I_c/D_c^2 \qquad \text{Equation (1)}$$

where $I_f$ is the intensity at the farther portion of the image; $I_e$ is the intensity at the closer portion of the image; $D_f$ is the distance from the projector to the farther portion; and $D_e$ is the distance from the projector to the closer portion. Thus, the target intensity of the closest portion may be expressed as follows:

$$I_c = I_f \times D_c^2/D_f^2 \qquad \text{Equation (2)}$$

If the pixels of the image 704 are expressed as RGB color space pixel values, such as from 0-255, then this expression can be translated to the HSL color space, for example. The Luminosity value "L" for each pixel of the closer portions of the image may then be adjusted based on Equation (2) set forth above. This conversion can be used to achieve equalization or uniformity of the intensity of the image 704, as illustrated at 722. Thus, in the example of FIG. 7, the intensity of the image 704 is equalized to be uniform with the intensity of the lower edge of the image 704, corresponding to the farther portion 712. Alternatively, in the case that the intensity of the light source of the projector 702 may be controllably increased, the intensity may be equalized based on an intensity value of a different portion of the image 704. The HSL Luminosity value for each pixel in the image 704 may be determined using Equation (2) above. For example, the intensity of the image may be mapped to the Luminosity (Lightness) of the HSL color space.

Further, in the case of a curved or shaped surface, multiple distance measurements may be employed when applying Equation (2). For example, if the surface is a convex partial cylinder, the gradient of the intensity is typically not linear along the surface. Therefore, multiple distance measurements taken at different points along the curvature of the display surface may be used for equalizing the intensity. As another example, if the display surface has a groove formed therein, then the portion of the image projected within the groove may be increased in intensity in at least some areas, depending on the shape and depth of the groove.

In addition, in some examples, the intensity of the projected light may be equalized across multiple projection display surfaces. For instance, the multiple display surfaces may not be coplanar, and thus, one surface may be on a different plane, at a different angle and/or at a different distance from the projector than another surface. As one example, suppose that a single ARFN of FIG. 1 projects an image onto the display surface 104(2) mounted on the table 108 and also onto the display surface 104(3), which may be handheld in proximity to the display surface 104(2). For instance, when playing a game such as Scrabble®, game tiles may be projected onto the handheld display surface 104(3) so as to be visible only to a particular user, while a Scrabble® board may be projected onto the table-mounted display surface 104(2). Accordingly, implementations herein may apply multiple calculations for the different distances to the multiple display surfaces and for the different attitudes or positions of the multiple display surfaces to provide a uniform intensity of the light projected onto the multiple display surfaces.

In some examples, the intensity of the image 704 may be equalized using a configurable screen or filter, such as a liquid crystal panel that can control the about of light passing through. Alternatively, in other examples, image processing techniques may be used to modify the image pixel information for controlling the intensity of one or more portions of the image. As one example, the HSL value of each pixel in the image may be determined along with a new value determined for Luminosity based on Equation (2) above. The HSL values with the new Luminosity values may then be converted back into RGB values and the pixel information for the equalized image may be provided to the projector 702 in the usual manner. Further, if the projector uses a different color space, rather than RGB, the pixel information may be similarly converted to HSL, provided with a new Luminosity value, and then converted to the other color space.

In some examples, the users may be able to manually adjust or override the intensity configurations, such as in the case that the automatic intensity adjustment is not to the user's liking. For example, a user may be provided with a remote control or other control that enables manual adjustment of the intensity or the intensity gradient of a displayed image. Additionally, in some examples, the manual override may be restricted to certain authorized users.

Furthermore, in some examples, the intensity adjustments herein may also take into consideration ambient light and surface lighting conditions. For example, if ambient lighting is greater on first area of a display surface than on a second area, then greater intensity may be applied to the first area to overcome potential washout from the greater ambient lighting at the first area. Thus, one or more light detectors may be associated with the AFRNs, the projectors, or the display surfaces herein in some implementations for detecting light levels on the display surfaces.

In some cases, overall power consumption may also be taken into consideration when controlling the intensity of an image. For example, if the power consumption is a parameter to be maintained at a particular level, then decreasing the intensity of a portion of a closer portion of an image may be performed rather than increasing an intensity of a farther portion of the image. In some implementations, a power profile may be applied that controls an amount by which an intensity of projected light may be increased, while still maintaining power consumption within an overall power consumption threshold.

Furthermore, an application profile may also be taken into consideration when controlling the intensity of a projected image, such as based on a desired intensity experience for different types of content or applications. For example, when a user is reading a book or other text, a background having a uniform intensity may reduce eye strain. On the other hand, when a movie or video game is projected onto a display surface, variations in intensity from one side of the display surface to the other may not be as noticeable to some users. In addition, different users may set different user profiles and preferences for controlling the intensity such as having a brighter or darker overall intensity, or having the intensity controlled for all applications and content types, or only for certain applications and content types.

Figure 8:
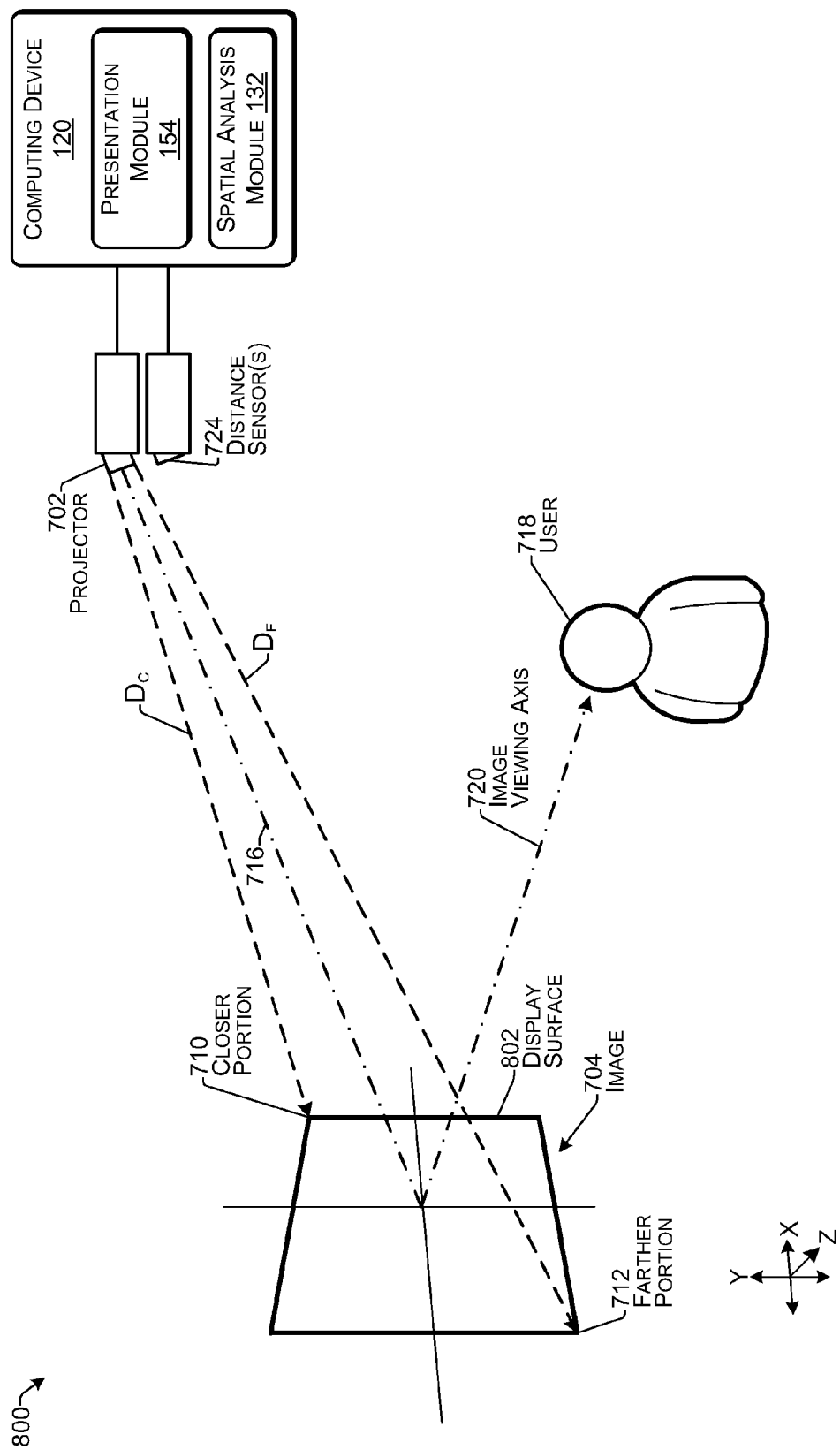
FIG. 8 illustrates an example projection system with intensity equalization according to some implementations.

FIG. 8 illustrates an example of a system 800 that includes the projector 702 for projecting one or more images 704 onto a display surface 802 according to some implementations. In this example, the display surface 802 may be at an oblique angle with respect to the axis of projection 716 in both the x-axis direction and the y-axis direction. Accordingly, in this example, a closest or closer portion 710 may be the upper right corner of the image 704 (or the upper right corner of the display surface), while a farthest or farther portion 712 may be the lower left corner of image 704 (or the lower right corner of the display surface), as viewed by the user 718. Thus, intensity of the entire image 704 may be equalized based on Equation (2) and the intensity $I_f$ (e.g., determined based on the Luminosity value in the HSL color space) of one or more pixels at the farther portion 712.

Further, in some examples, the intensity equalization techniques herein may take into consideration the viewing position of the user 718 when equalizing the intensity of the image 704. For example, if the image viewing axis 720 at which the user 718 is viewing the image 704 is not substantially perpendicular to the display surface 802, then this can affect the perceived brightness of different portions of the image 704. Accordingly, in some examples, the distance sensors 724, or other distance sensors or devices, as described above, may determine a position of the user 718 with respect to the display surface 802, and may determine a closest distance of the user 718 to the image 704 and a farthest distance of the user 718 to the image 704. The presentation module 154 may then take the differences in distance of the user 718 to the closer and farther portions of the image 704 into consideration when equalizing the overall intensity of the image 704 for viewing by the user at a particular location. Thus, in some examples, as the user moves relative to the display surface, the intensity of the image may be dynamically equalized differently to account for different viewing positions of the user 718.

In addition, rather than determining the distances $D_e$ and $D_f$ directly, the distance sensors may determine other aspects that are indicative of the distances $D_e$ and $D_f$. As an example, the projector may have a field of view 208 of a known quantity, as discussed above with respect to FIG. 2. Accordingly, the distances $D_e$ and $D_f$ may be determined from a size of the projected image and an angle of the projection axis. Numerous other geometric techniques for determining $D_e$ and $D_f$ will be apparent to those of skill in the art in light of the disclosure herein. Further, in some examples, when the image is projected onto a projection display surface that is fixed relative to the projector, the distances $D_e$ and $D_f$ may be fixed quantities that are stored in a storage, such as the system parameters datastore 134 discussed above. In such a case, determining the distances $D_e$ and $D_f$ may include retrieving these values from the datastore.

Figure 9:
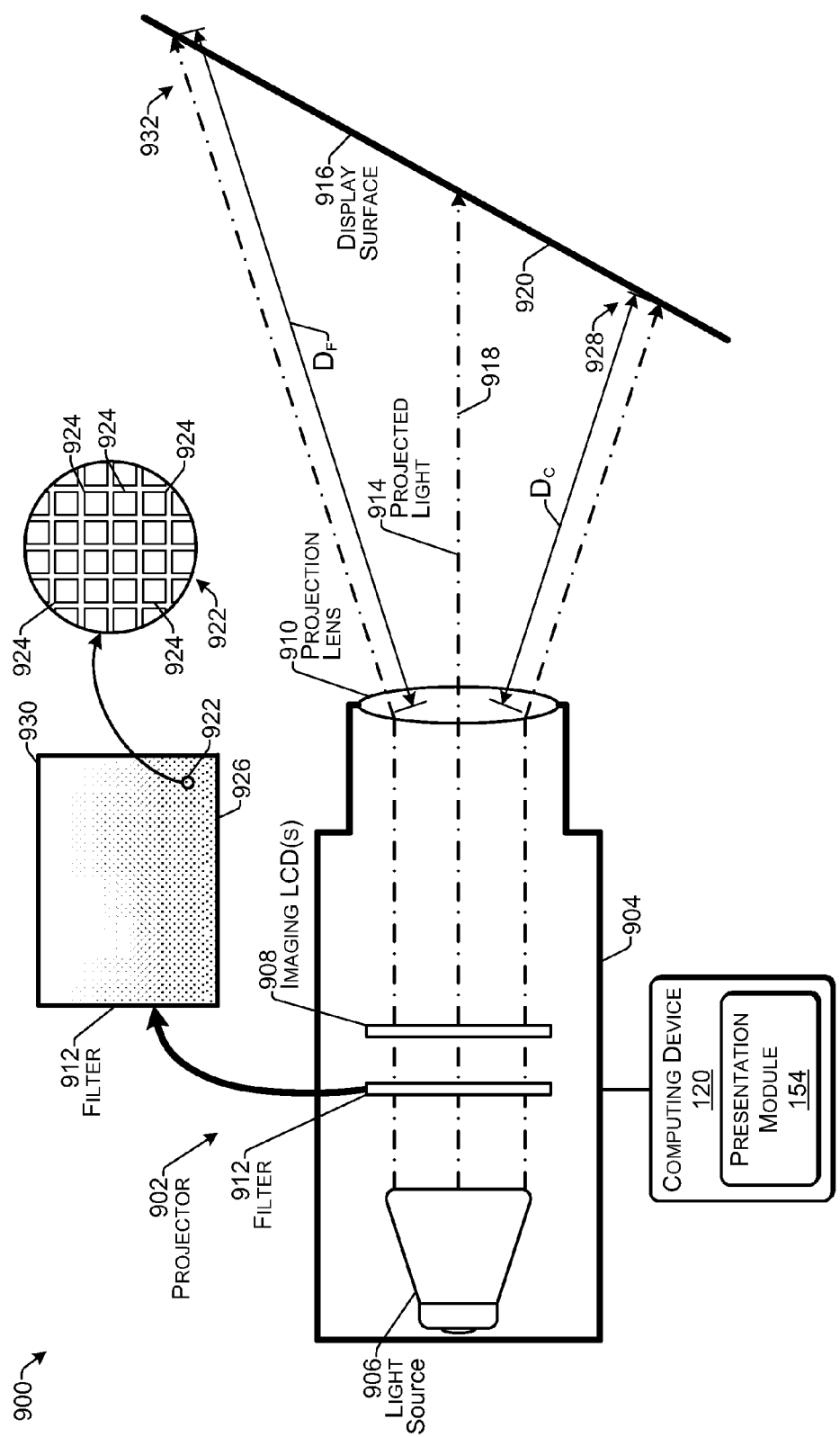
FIG. 9 illustrates an example projector apparatus for providing intensity equalization according to some implementations.

FIG. 9 illustrates an example projector apparatus 900 that may be employed for equalizing image light intensity according to some implementations. In this example, a projector 902 has a housing 904 that contains a light source 906. The projector 902 may further include one or more imaging components, such as one or more imaging LCDs 908, and a projection lens 910. In this example, the projector 902 includes a filter 912, which may be a grayscale liquid crystal panel having a plurality of area or pixels with a transparency that is individually or separately controllable for each area or pixel. For example, the presentation module 154 of the computing device 120, as described above, may control the amount of transparency of each pixel of the filter 912, such as on a scale of values from 0-255.

Light from the light source 906 passes through the filter 912, the one or more imaging LCDs 908, and the projection lens 910 as projected light 914 that impinges on a display surface 916. When the display surface 916 is at an oblique angle relative to a major axis 918 of the projected light 914, there may be a noticeable variation in the intensity of an image 920 projected onto the display surface 916. Accordingly, based on the distance $D_e$ to the closer portion of the image 920 and the distance $D_f$ to the farther portion of the image 920, an amount of light intensity filtering to be applied may be determined based on Equation (2) discussed above. For instance, if the filter 912 is an LC panel having approximately the same number of pixels as in the image 920, then one or more pixels corresponding to the farther first portion of the image 920 may be un-shaded, while the pixels of the filter 912 corresponding to the closest portion of the image 920 may have a selected shade of gray applied to them to reduce the intensity of the light projected through the filter 912 and onto the closer portions of the image 920.

As one example, as illustrated at 922, the filter 912 may be a liquid crystal panel having a plurality of separately addressable pixels or controllable areas 924, which may be arranged in a grid. Each controllable area 924 in the panel may have a controllable amount of transparency, and such as being able to display 255 varying shades of gray, which range from essentially transparent at level 0 to black or opaque at level 255. Accordingly, with knowledge of the distances $D_f$ and $D_e$, and based on Equation (2), the presentation module 154 may determine a particular shade of gray to be applied to each pixel in the panel of the filter 912 to equalize the intensity of the image 920 projected onto the display surface 916.

Thus, as illustrated in the example of FIG. 9, at a lower portion 926 of the filter 912, the controllable areas 924 have a shade of gray applied to reduce the intensity of a portion of the projected light corresponding to a closer portion 928 of the image 920 and the display surface 916. On the other hand, an upper portion 930 of the filter 912 has controllable areas that are substantially transparent so that the base level brightness of the image 920 is not reduced at the farther portion 932. The pixels or controllable areas 924 between the lower portion 926 and the upper portion 930 gradually become more transparent from the lower portion 926 to the upper portion 930 in a gradient corresponding to the angle and configuration of the display surface 916. As one example, if the display surface is a hemisphere, the gradient applied to the filter 912 may be circular with the darkest pixels toward the center of the filter and the pixels becoming more transparent toward the edges of the filter 912. Accordingly, implementations herein are not limited to any particular configuration of the display surface.

In addition, in some examples, the size of the pixels or controllable areas 924 need not necessarily match the size or number of pixels in the projected image 920. For instance, in some implementations, larger controllable areas 924 may be used in the filter 912. The amount of transparency to be applied to each controllable area 924 may be determined according to an average desired intensity reduction for a group of pixels or portion of the image 920 corresponding to each of the controllable areas 924 of the filter 912. Furthermore, while the image 920 projected onto the display surface 916 may be skewed or may have a keystone effect due to the angle of the surface 916 with respect to the projection axis 918, these effects may be reduced or eliminated, such as by using various image processing techniques, projector focusing techniques, or the like, as is known.

Additionally, while the filter 912 is shown positioned between the light source 906 and the imaging component(s) 908 in this example, in other examples, the filter 912 may be positioned between the imaging component(s) 908 and the projection lens 910, or in any other suitable location along the path of the projected light 914. Furthermore, the filter 912 may be used with any suitable type of projector 904, and is not limited to use with LCD imaging projectors. For example, the filter 912 may be used with a laser diode projector, a single-LCD projector, a three-LCD projector, a color wheel projector, and so forth.

In addition, while the filter 912 has been described above as reducing the intensity of a portion of the projected light 914 corresponding to the closer portion 928 of the image 920, in other examples, the filter 912 may be a powered or active filter that increases a portion of the projected light corresponding to the farther portion 932 of the image 920. Accordingly, in some examples, the intensity of at least a portion of the image 920 may be increased when equalizing the intensity of the image 920. As one example, the filter 912 may be a light emitting diode filter (LED filter). Numerous other variations will be apparent to those of skill in the art having the benefit of the disclosure herein.

Figure 10:
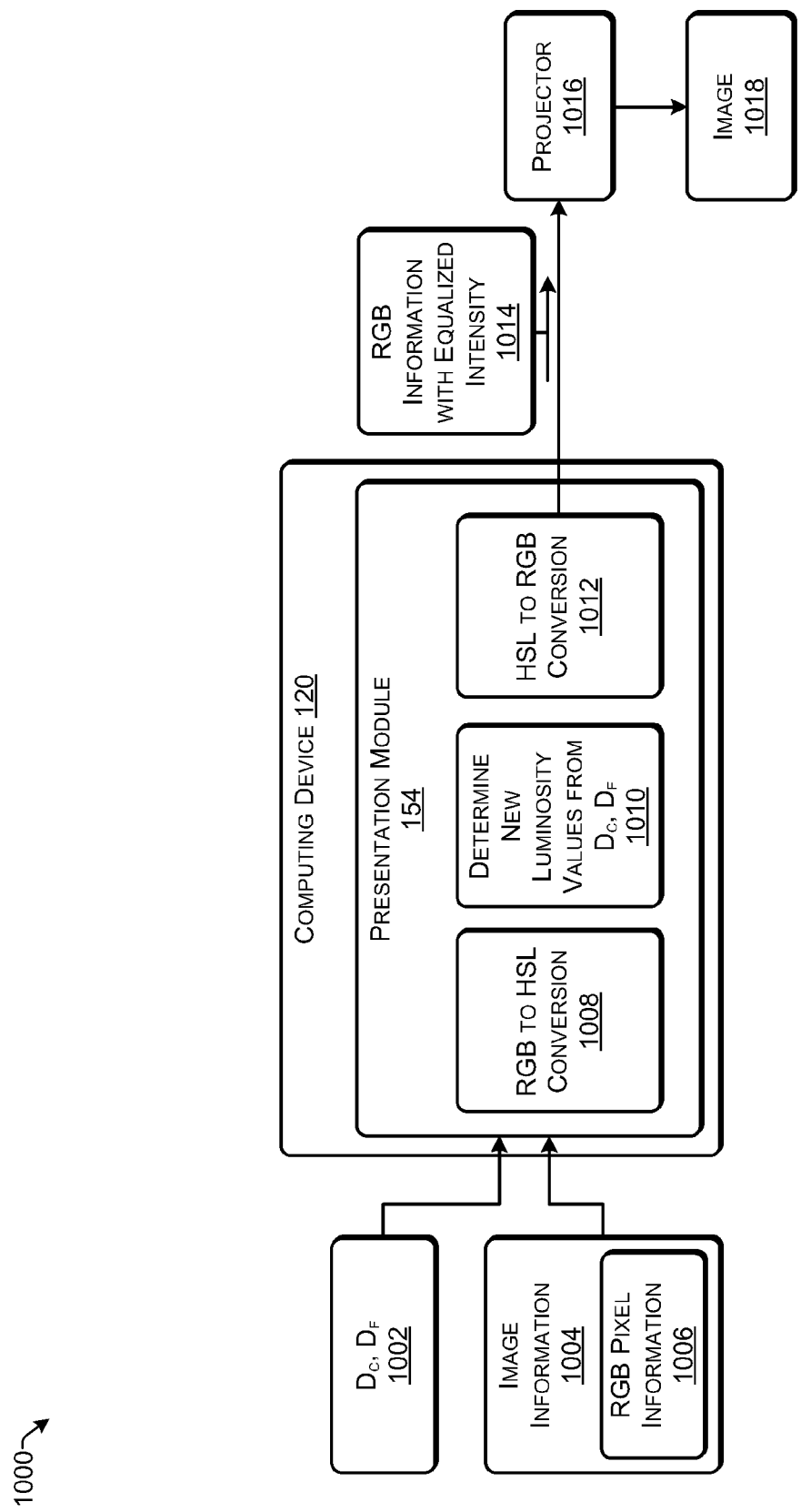
FIG. 10 illustrates an example framework for intensity equalization according to some implementations.

FIG. 10 illustrates an example framework 1000 for equalizing the intensity of a projected image, which may be achieved without use of a physical filter in the projector. In this example, as illustrated at 1002, the presentation module 154 determines the distance $D_e$ corresponding to a closest or closer portion of the projected image, or a closest or closer portion of the display surface upon which the image will be projected. The presentation module 154 further determines the distance $D_f$ corresponding to a farthest or farther portion of the image, or a farthest or farther portion of the display surface, as discussed above. The presentation module 154 may further receive or obtain image information 1004, which may include RGB pixel information 1006, such as an RGB triple for each pixel in the image in some implementations. As indicated at 1008, the presentation module may perform RGB to HSL conversion to convert the RGB values of each pixel to the generally equivalent HSL values (or values in another suitable color space, as discussed above). Furthermore, as indicated at 1010, the presentation module 154 may determine new Luminosity values based at least in part on the distances $D_e$ and $D_f$ and equation (2) as discussed above. For example, the Luminosity (Lightness) in the HSL color space may map to, or may be expressed as a function of, the light intensity of the image. As indicated at 1012, the presentation module 154 may then convert the HSL values for each pixel back to RGB values using the newly determined Luminosity values for one or more portions of the image that will have the intensity adjusted. Accordingly, the new RGB values have been adjusted or equalized to provide a uniform intensity across the image projected onto the surface at the distances $D_e$ and $D_f$. The presentation module 154 may send the RGB information 1014 having equalized intensity to a projector 1016. The projector 1016 may employ the RGB information 1014 to display an image 1018 corresponding to the received image information 1004 having an intensity that has been equalized for the intended display surface.

Furthermore, in some examples, conversion of the image information from one color space to another color space may not be performed. For instance, in some situations, only the intensity or luminance values are determined and adjusted using any desired color space or color model, such as HSL, HSV, CIE, YCbCr, and so forth. In other examples, any suitable technique may be employed to determine relative intensities of the portions of the image to be projected and/or to adjust the intensity of each portion to equalize the intensity of the projected light for a particular display surface. As mentioned above, implementations herein are not limited to conversion to or from any particular color space, and various mathematical calculations or algorithms by be derived based on Equations (1) or (2) for equalizing the intensity of the projected/reflected light without converting the image information from one color space to another. For example, a differential equation may be employed based on the principle set forth in equations (1) and (2). Consequently, numerous variations of the techniques described herein will be apparent to those of skill in the art having the benefit of the disclosure herein.

Accordingly, the presentation module 154 may employ image processing techniques to provide equalization of the intensity of a projected image 1018. The techniques described herein may be used in a variety of situations and applications, such as for projection of pages of electronic books or projection of other content items such as movies, videos, television shows, video games, slide presentations, photograph viewing, and the like. In some examples, the computing device 120 or the projector 1016 may be include a field-programmable gate array (FPGA), which is an integrated circuit designed to perform, at high speed, the image processing attributed to the presentation module 154 in FIG. 10.

Furthermore, in some examples herein, the framework 1000 of FIG. 10 may be applied to dynamically equalize the intensity of an image 1018 on the fly, such as when a display surface is moved or is being moved relative to a projector or the like. For example, when the distance to a portion of the display surface changes by a threshold amount, the presentation module may recalculate the intensity equalization for a projected image. Thus, the presentation module 154 may receive new $D_e$ and $D_f$ information and may equalize the intensity of the projected image accordingly for the new distance information. Similar dynamic adjustments also may be employed with the filter implementation described above with respect to FIG. 9.

Figure 11:
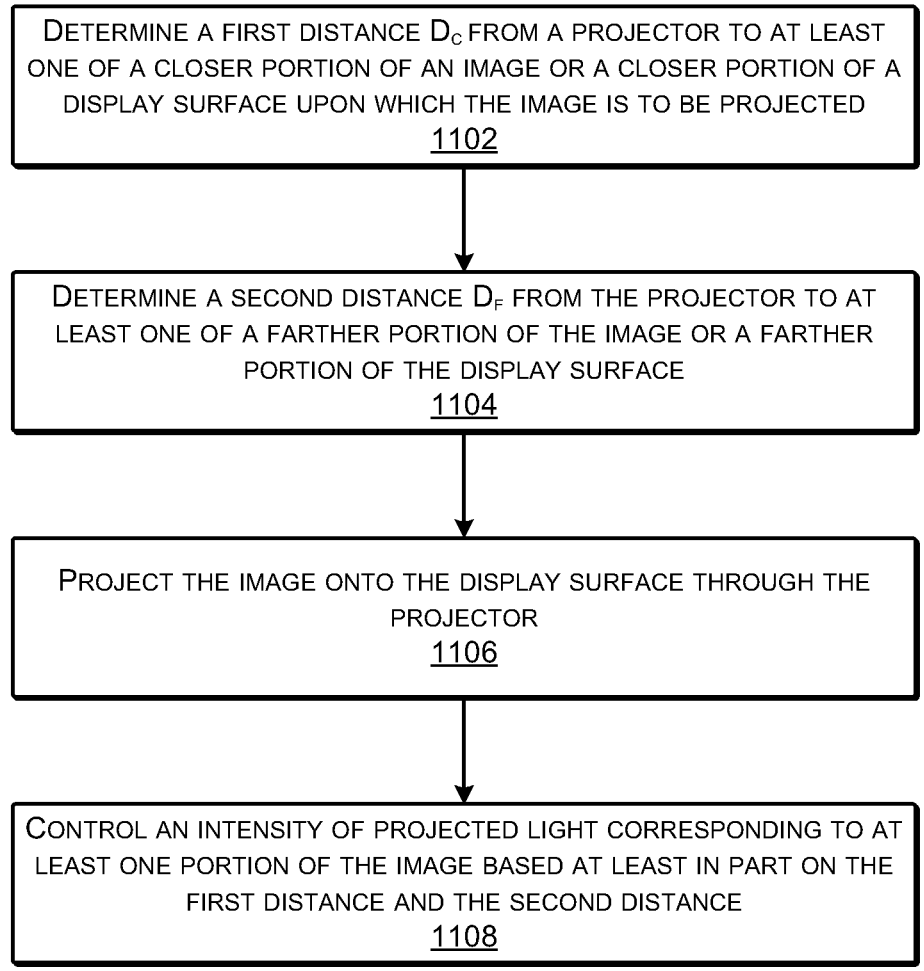
FIG. 11 is an example flow diagram of a process for intensity equalization according to some implementations.
Figure 12:
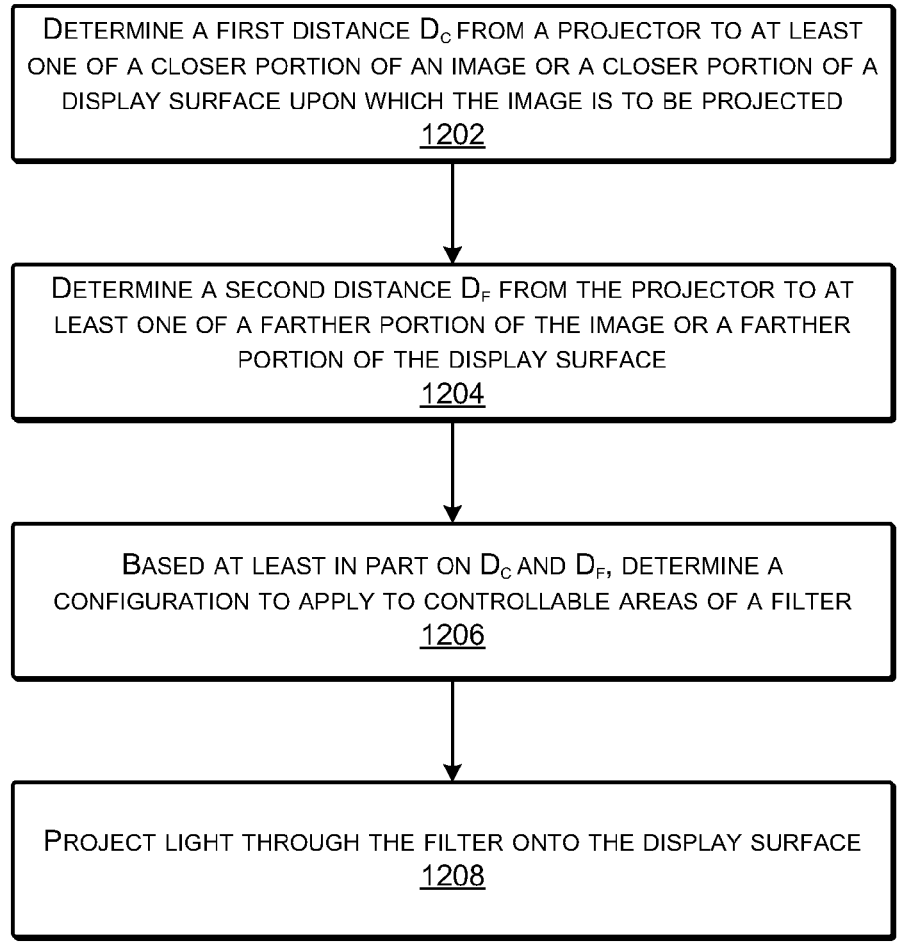
FIG. 12 is an example flow diagram of a process for intensity equalization using a filter according to some implementations.

FIGS. 11 and 12 show illustrative processes for displaying an image on a projection display with intensity equalization according to some implementations. The processes described herein may be implemented by the architectures and systems described herein, or by other architectures and systems. These processes are illustrated as a collection of blocks in a logical flow graph. Some of the blocks represent operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order or in parallel to implement the processes. Further, not all of the blocks are executed in each implementation. It is understood that the following processes may be implemented with other architectures as well.

FIG. 11 is a flow diagram of a process 1100 for intensity equalization according to some implementations. In some examples, the process 1100 may be executed, at least in part, by the presentation module 154 of the computing device 120 discussed above with respect to FIG. 1.

At 1102, the presentation module may determine a first distance $D_e$ from a projector to at least one of a closer portion of an image or a closer portion of a display surface upon which the image is to be projected. For example, the presentation module may obtain information from one or more distance sensors to determine the distance $D_e$. In other examples, the presentation module may retrieve the distance $D_e$ from a storage location.

At 1104, the presentation module may determine a second distance $D_f$ from the projector to at least one of a farther portion of the image or a farther portion of the display surface. For example, the presentation module may obtain information from one or more distance sensors to determine the distance $D_f$. In other examples, the presentation module may retrieve the distance $D_f$ from a storage location.

At 1106, the presentation module may project the image onto the display surface through the projector. For example, the image may be a still image, a video image, or the like.

At 1108, the presentation module controls an intensity of projected light corresponding to at least one portion of the image based at least in part on the first distance $D_e$ and the second distance $D_f$. In some examples, the intensity is equalized using image processing techniques to change pixel information for a portion of the image, such as based on Equation (2) discussed above. In other examples, a filter in the projector is configured to equalize the intensity of a portion of the image, such as based on Equation (2) discussed above. The equalization may take place before, during or after the light of the image is projected onto the display surface.

FIG. 12 is a flow diagram of a process 1200 for intensity equalization using a filter in the projector according to some implementations. In some examples, the process 1200 may be executed, at least in part, by the presentation module 154 of the computing device 120 discussed above with respect to FIG. 1.

At 1202, the presentation module may determine a first distance $D_e$ from a projector to at least one of a closer portion of an image or a closer portion of a display surface upon which the image is to be projected. For example, the presentation module may obtain information from one or more distance sensors to determine the distance $D_e$. In other examples, the presentation module may retrieve the distance $D_e$ from a storage location.

At 1204, the presentation module may determine a second distance $D_f$ from the projector to at least one of a farther portion of the image or a farther portion of the display surface. For example, the presentation module may obtain information from one or more distance sensors to determine the distance $D_f$. In other examples, the presentation module may retrieve the distance $D_f$ from a storage location.

At 1206, the presentation module may determine a configuration to apply to controllable areas of a filter, based at least in part on $D_e$ and $D_f$. For example, the presentation module may employ Equation (2) discussed above to determine an amount of transparency or opacity to apply to each controllable area of the filter.

At 1208, the presentation module may project light through the filter onto the display surface. Accordingly, the intensity of projected light impinging the display surface is equalized by the configuration of the filter.

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. A system comprising:
    a projector to project light corresponding to an image, the projector including a filter to modify an intensity of the light;
    one or more processors;
    one or more computer-readable media; and
    a presentation module maintained on the one or more computer-readable media, which when executed by the one or more processors, causes the one or more processors to perform operations that include:
        determining a first distance from the projector to a closer portion of a display surface upon which the image is to be projected;
        determining a second distance from the projector to a farther portion of the display surface upon which the image is to be projected;
        modifying the intensity of at least a portion of the light by gradually transitioning from a first transparency at a first portion of the filter to a second transparency at a second portion of the filter based at least in part on at least the first distance and the second distance; and
        causing the projector to project the light onto the display surface, the light including at least the portion of the light having the modified intensity.

2. The system as recited in claim 1, wherein the modifying the intensity further comprises:
    determining at least a luminosity component of pixel information from the image;
    determining a new value of the luminosity component for one or more pixels of a portion of the image corresponding to the modified intensity, the new value of the luminosity component being determined based at least in part on the first distance and the second distance; and
    modifying the pixel information based on the new value of the luminosity component.

3. The system as recited in claim 1, wherein the modifying the intensity is based at least in part on the second distance squared divided by the first distance squared.

4. The system as recited in claim 1, wherein the modifying the intensity further comprises at least one of:
    configuring the first portion of the filter to modify the intensity of the portion of the light corresponding to the closer portion of the image;
    or configuring the second portion of the filter to modify the intensity of the portion of the light corresponding to the farther portion of the image.

5. A method comprising:
    determining a first distance from a projector to a closer portion of an image;
    determining a second distance from the projector to a farther portion of the image;
    projecting the image onto a display surface through the projector; and
    controlling, using a liquid crystal panel arranged in a grid of a plurality of individually controllable areas, an intensity of light corresponding to at least one portion of the image by gradually transitioning from a first transparency at a first portion of the grid to a second transparency at a second portion of the grid based at least in part on the first distance and the second distance.

6. The method as recited in claim 5, wherein the liquid crystal panel comprises a grayscale liquid crystal panel and each of the areas of the plurality of individually controllable areas are controllable between a first amount of transparency and a second amount of transparency to alter the intensity of the light corresponding to the at least one portion of the projected image.

7. The method as recited in claim 5, further comprising determining the first distance and the second distance using at least one of: time-of-flight measurement; structured light; ultrasound; infrared light; interferometry; a ranging system; or a camera.

8. The method as recited in claim 5, wherein the controlling the intensity further comprises changing pixel information for a plurality of pixels of the image corresponding to the at least one portion of the image to reduce or increase the intensity of the light corresponding to the at least one portion of the image.

9. The method as recited in claim 5, wherein the controlling the intensity further comprises:
   converting pixel information for the image from a red, green, blue (RGB) color space to a hue, saturation, luminosity color space;
   determining new luminosity values for a plurality of pixels of the image corresponding to the at least one portion of the image based at least in part on the first distance and the second distance;
   converting the pixel information back to the RGB color space using the new luminosity values; and
   providing the pixel information to the projector.

10. The method as recited in claim 5, wherein the controlling the intensity is based at least in part on the second distance squared divided by the first distance squared.

11. The method as recited in claim 5, further comprising repeating the determining the first distance, the determining the second distance, and the controlling the intensity when a change in one of the first distance or the second distance beyond a threshold amount is detected.

12. The method as recited in claim 5, further comprising determining the first distance and the second distance by retrieving stored data indicating the first distance and the second distance.

13. The method as recited in claim 5, wherein the display surface is a moveable handheld screen.

14. The method as recited in claim 5, wherein controlling the intensity is based at least in part on a position of a user with respect to the closer portion of the image and the farther portion of the image.

15. The method as recited in claim 6, wherein the display surface comprises a curved surface.

16. A system comprising:
   a projector having a light source, at least one imaging component, and a projector lens; and
   a filter located between the light source and the projector lens, the filter including a liquid crystal panel having a grid comprising a plurality of controllable areas, each controllable area being controllable to gradually transition from a first level of transparency at a first portion of the grid to a second level of transparency at a second portion of the grid to control an intensity of a portion of a projected image relative to another portion of the projected image.

17. The system as recited in claim 16, wherein the at least one imaging component comprises at least one of a liquid crystal display component or a laser diode component for displaying an image to be projected.

18. The system as recited in claim 16, further comprising one or more distance sensors for determining a first distance from the projector to a closer portion of a display surface and a second distance from the projector to a farther portion of the display surface.

19. The system as recited in claim 18, further comprising a computing device, the computing device configured to determine the first level of transparency of the first portion at the grid and the second level of transparency at the second portion of the grid based at least in part on the first distance and the second distance.

20. The system as recited in claim 16, wherein each area of the plurality of controllable areas of the filter are further configured based at least in part on a power consumption parameter.

21. A non-transitory computer-readable media comprising instructions which, when executed by one or more processors, cause the one or more processors to perform operations comprising:
   determining a first distance from a projector to a closer portion of a display surface;
   determining a second distance to a farther portion of the display surface;
   projecting light onto the display surface through the projector; and
   modifying, using a liquid crystal filter arranged as a grid of individually controllable areas, an intensity of a portion of the light projected onto the display surface by gradually transitioning from a first transparency at a first portion of the grid to a second transparency at a second portion of the grid based at least in part on the first distance and the second distance.

22. The non-transitory computer-readable media as recited in claim 21, wherein the determining the first distance and the determining the second distance is based at least in part on information received from one or more distance sensors.

23. The non-transitory computer-readable media as recited in claim 21, wherein the modifying the intensity further comprises changing pixel information for a plurality of pixels of a projected image corresponding to the portion of the light.

24. The non-transitory computer-readable media as recited in claim 21, wherein the modifying the intensity is based at least in part on an intensity of the light projected onto the farther portion multiplied by the second distance squared divided by the first distance squared.

25. The non-transitory computer-readable media as recited in claim 21, wherein the modifying the intensity is further based at least in part on at least one of: a type of content to be displayed, or a user preference.

26. The non-transitory computer-readable media as recited in claim 21, wherein the modifying the intensity is further based at least in part on ambient lighting conditions at the display surface.

* * * * *